US011295530B2

(12) United States Patent
Koyama

(10) Patent No.: US 11,295,530 B2
(45) Date of Patent: Apr. 5, 2022

(54) ELECTRONIC APPARATUS FOR PLAYING BACK A VIRTUAL REALITY VIDEO IMAGE AND CONTROL METHOD THEREFOR

(71) Applicant: CANON KABUSHIKI KAISHA, Tokyo (JP)

(72) Inventor: Jun Koyama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/197,726

(22) Filed: Mar. 10, 2021

(65) Prior Publication Data

US 2021/0287447 A1 Sep. 16, 2021

(30) Foreign Application Priority Data

Mar. 13, 2020 (JP) .............................. JP2020-044306

(51) Int. Cl.
*G06T 19/00* (2011.01)
*G06F 3/01* (2006.01)
*G02B 27/01* (2006.01)

(52) U.S. Cl.
CPC ........ *G06T 19/006* (2013.01); *G02B 27/0172* (2013.01); *G06F 3/012* (2013.01); *G06F 3/013* (2013.01); *G02B 2027/0138* (2013.01); *G02B 2027/0187* (2013.01)

(58) Field of Classification Search
CPC ....... G06T 19/006; G06F 3/013; G06F 3/012; G06F 3/011; G02B 27/0172; G02B 2027/0138; G02B 2027/0187
See application file for complete search history.

(56) References Cited

U.S. PATENT DOCUMENTS

| 2018/0121069 A1 | 5/2018 | Diverdi |
| 2018/0367777 A1 | 12/2018 | Li |
| 2020/0037029 A1 | 1/2020 | He |

FOREIGN PATENT DOCUMENTS

| JP | 2019121224 A | * | 7/2019 |
| JP | 2019121224 A | | 7/2019 |

OTHER PUBLICATIONS

Copending U.S. Appl. No. 17/197,545, filed Mar. 10, 2021, published as US 2021/0287446.

(Continued)

*Primary Examiner* — Jeffery A Brier
(74) *Attorney, Agent, or Firm* — Rossi, Kimms & McDowell LLP

(57) ABSTRACT

An electronic apparatus obtains attitude information about the electronic apparatus; controls playback of a VR video image such that a range of a part in each of frame images is displayed on a screen, the part being based on a direction corresponding to the attitude information; executes pattern-matching processing between a first and second VR video image and detecting a common subject; and performs control such that, when the second VR video image starts to be played back, a range of a part in a second frame image to be displayed first is displayed on the screen, the part being based on a difference of a direction corresponding to the attitude information from a direction of the common subject in the first frame image displayed when the playback of the first VR video image is ended and on a direction of the common subject in the second frame image.

12 Claims, 14 Drawing Sheets

(56) References Cited

OTHER PUBLICATIONS

Office Action issued in U.S. Appl. No. 17/197,545 dated Oct. 13, 2021.
Office Action issued in U.S. Appl. No. 17/197,545 dated Jan. 27, 2022.

* cited by examiner

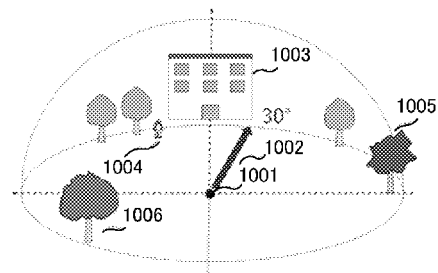

FIG.13A  NORTH = 0°

REFERENCE
DIRECTION OF N
IN SHOOTING

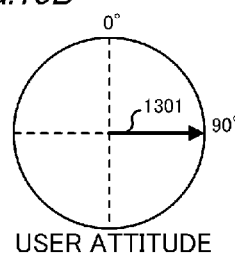

FIG.13B

USER ATTITUDE

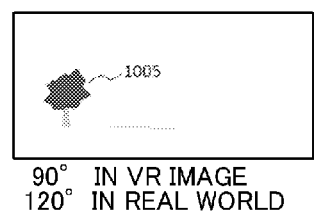

FIG.13C

90°  IN VR IMAGE
120°  IN REAL WORLD

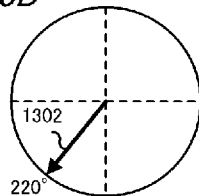

FIG.13D

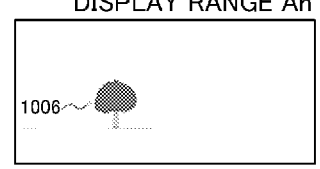

FIG.13E  DISPLAY RANGE An

220°  IN VR IMAGE
250°  IN REAL WORLD

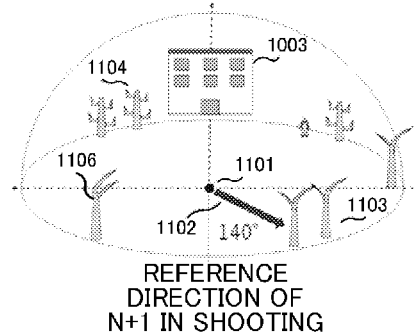

FIG.13F  NORTH = 0°

REFERENCE
DIRECTION OF
N+1 IN SHOOTING

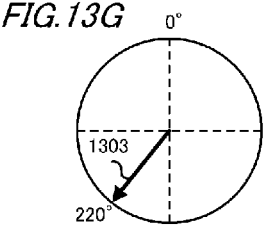

FIG.13G

ATTITUDE
INFORMATION α

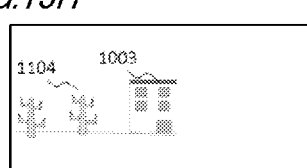

FIG.13H

220°  IN VR IMAGE
0°  IN REAL WORLD

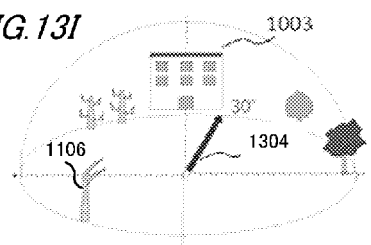

FIG.13I

CHANGED REFERENCE
DIRECTION OF N+1
An = α + REFERENCE DIRECTION
250 = 220+30

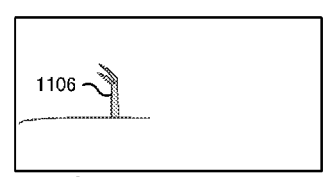

FIG.13J

220°  IN VR IMAGE
250°  IN REAL WORLD

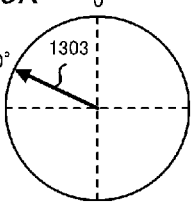

FIG.13K

ATTITUDE
INFORMATION α

An = α + REFERENCE DIRECTION
250 = 300+310

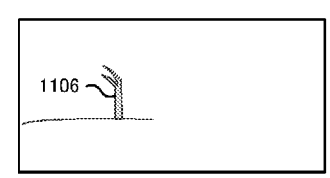

FIG.13L

220°  IN VR IMAGE
250°  IN REAL WORLD

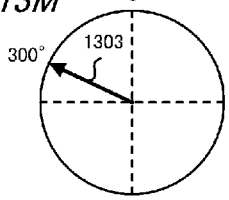

FIG.13M

An = α + REFERENCE DIRECTION
250 = 220+30

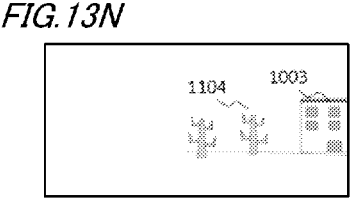

FIG.13N

300°  IN VR IMAGE
250° +80°  IN REAL WORLD

FIG.14A NORTH = 0°

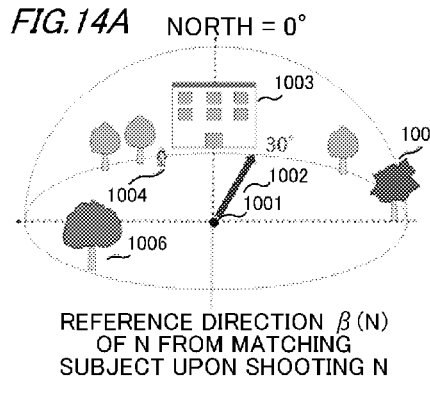

REFERENCE DIRECTION β (N)
OF N FROM MATCHING
SUBJECT UPON SHOOTING N

FIG.14B

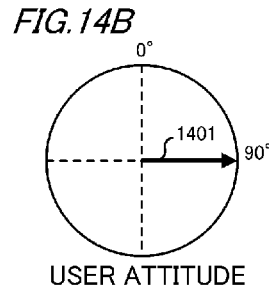

USER ATTITUDE

FIG.14C

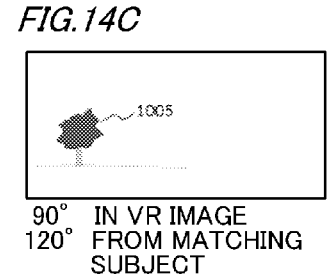

90° IN VR IMAGE
120° FROM MATCHING
SUBJECT

FIG.14D

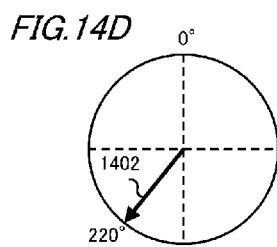

FIG.14E
DISPLAY RANGE An

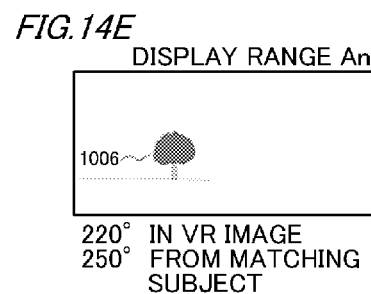

220° IN VR IMAGE
250° FROM MATCHING
SUBJECT

FIG.14F NORTH = 0°

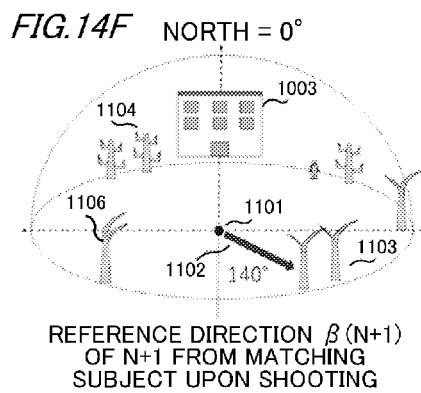

REFERENCE DIRECTION β (N+1)
OF N+1 FROM MATCHING
SUBJECT UPON SHOOTING

FIG.14G

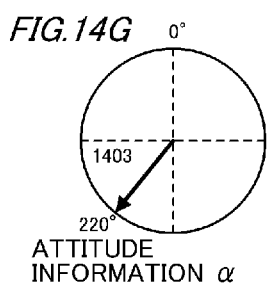

ATTITUDE
INFORMATION α

FIG.14H

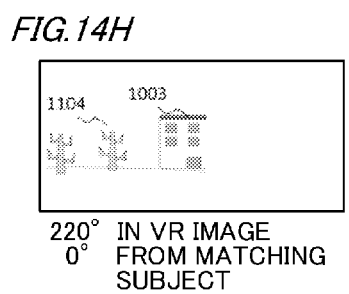

220° IN VR IMAGE
0° FROM MATCHING
SUBJECT

FIG.14I

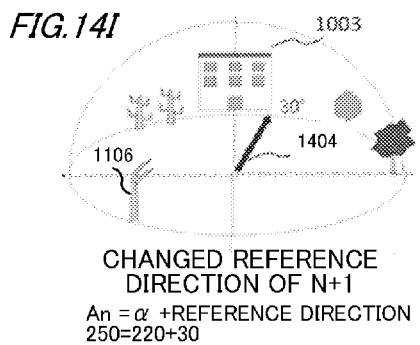

CHANGED REFERENCE
DIRECTION OF N+1
An = α +REFERENCE DIRECTION
250=220+30

FIG.14J

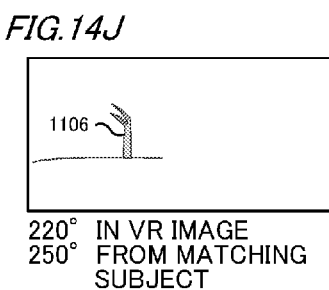

220° IN VR IMAGE
250° FROM MATCHING
SUBJECT

US 11,295,530 B2

ELECTRONIC APPARATUS FOR PLAYING BACK A VIRTUAL REALITY VIDEO IMAGE AND CONTROL METHOD THEREFOR

BACKGROUND OF THE INVENTION

Field of the Invention

The present invention relates to an electronic apparatus, a method for controlling the electronic apparatus, and a recording medium.

Description of the Related Art

In recent years, technology has been developed to capture a virtual reality (VR) image having video images with a wider range than the human viewing angle, such as an omnidirectional image and image and to play back a plurality of VR video images.

Japanese Patent Application Publication No. 2019-121224 indicates that the range according to the initial direction set by the user is displayed every time scenes are switched.

According to the disclosure of Japanese Patent Application Publication No. 2019-121224, the user needs to set the initial direction for each chapter.

SUMMARY OF THE INVENTION

The present invention provides an electronic apparatus which can display a desired display range even when the user does not set a display range before the start of playback.

The electronic apparatus according to the present invention is the electronic apparatus capable of playing back a VR video image, the apparatus including: a processor; and a memory storing a program which, when executed by the processor, causes the electronic apparatus to: obtain attitude information about the electronic apparatus; control playback of a VR video image such that a range of a part in each of frame images included in the VR video image is displayed on a screen, the part being based on a direction corresponding to the attitude information; execute pattern-matching processing between a first VR video image and a second VR video image that is different from the first VR video image and detecting a common subject; and perform control such that, when the second VR video image starts to be played back successively after the end of playback the first VR video image, a range of a part in a second frame image of the second VR video image to be displayed first is displayed on the screen, the part being based on a difference of a direction corresponding to the attitude information at the end of playback of the first VR video image from a direction of the common subject in the first frame image displayed when the playback of the first VR video image is ended and on a direction of the common subject in the second frame image.

Further features of the present invention will become apparent from the following description of exemplary embodiments with reference to the attached drawings.

BRIEF DESCRIPTION OF THE DRAWINGS

FIGS. 13A to 13N illustrate examples of a situation in shooting a VR video image and a display range thereof in Example 1; and FIGS. 14A to 14J illustrate examples of a situation in shooting a VR video image and a display range thereof in Example 2.

DESCRIPTION OF THE EMBODIMENTS

First Embodiment

Figure 1A:
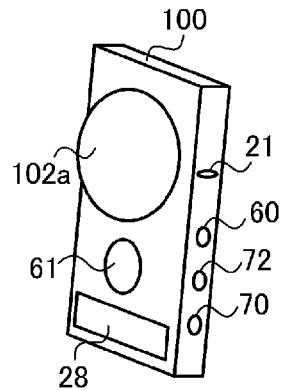
FIGS. 1A to 1C are outside appearance views and a block diagram of a digital camera.
Figure 1B:
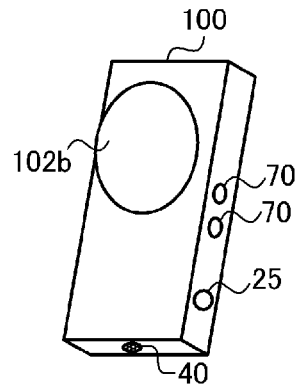

Hereinafter, preferred embodiments of the invention will be described in conjunction with the accompanying drawings. FIG. 1A is a front perspective view (outside appearance view) of a digital camera 100 (an imaging apparatus) as an electronic apparatus. FIG. 1B is a rear perspective view (an outside appearance view) of the digital camera 100. The digital camera 100 is an omnidirectional camera (a VR camera).

A barrier 102a is a protection window for the front camera part of a digital camera 100 which covers the range in front of the digital camera. The front camera part is, for example, a wide-angle camera unit with a shooting range of 180° or more in the vertical and horizontal directions in front of the digital camera 100. A barrier 102b is a protection window for the rear camera unit which covers the range on the rear side of the digital camera 100. The rear camera unit is for example a wide-angle camera unit which covers a wide shooting range of 180° or more in the vertical and horizontal directions on the rear side of the digital camera 100.

A display unit 28 displays various kinds of information. A shutter button 61 is an operation unit (an operation member) for giving shooting instructions. A mode selecting switch 60 is an operation unit for switching among various modes. A connection I/F 25 is a connector for connecting a connection cable to the digital camera 100. An external device such as a smartphone, personal computer, and a television set is connected to the digital camera 100 using the connection cable. An operation unit 70 may include various switches, buttons, dials, and touch sensors for accepting various kinds of operation from the user. A power supply switch 72 is a push button for switching between power on and off states.

A light-emitting part 21 is a light-emitting member such as a light-emitting diode (LED) and notifies the user of various states of the digital camera 100 for example by light-emitting patterns and colors. A fixing part 40 is, for example, a tripod screw hole, and is used to fix and install the digital camera 100 with a fixing device such as a tripod.

Figure 1C:
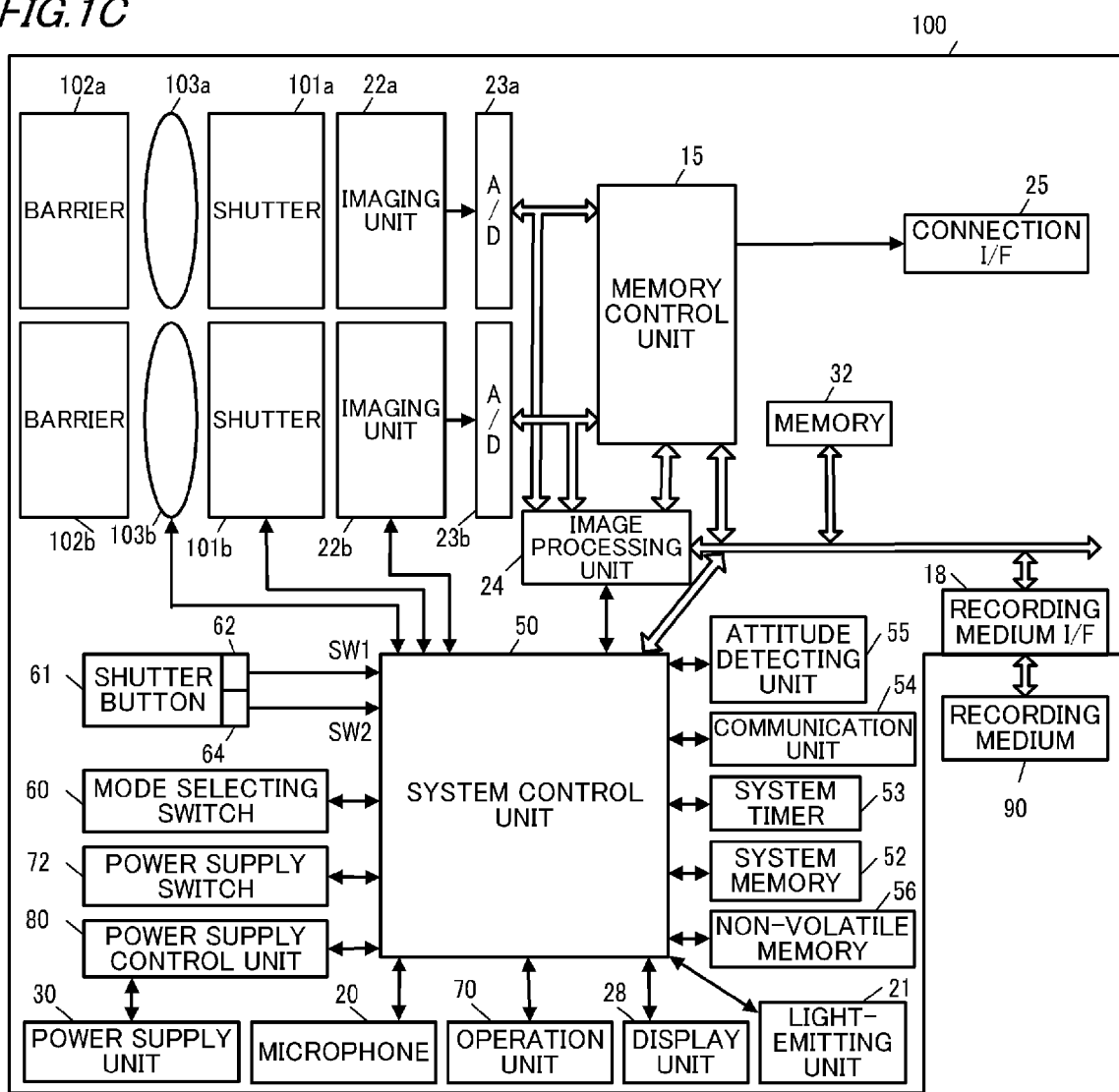

FIG. 1C is a block diagram of an exemplary configuration of the digital camera 100.

The barrier 102a covers the imaging system (such as a shooting lens 103a, a shutter 101a, and an imaging unit 22a) of the front camera part to prevent the imaging system from getting contaminated or damaged. The shooting lens 103a is a lens group which includes a zoom lens and a focus lens and is a wide-angle lens. The shutter 101a is a shutter with an aperture function which adjusts the amount of object light entering the imaging unit 22a. The imaging unit 22a is an imaging apparatus (an imaging sensor) including a CCD or CMOS device which convert an optical image into an electrical signal. An A/D converter 23a converts an analog signal output from the imaging unit 22a into a digital signal. The shooting lens 103a may have an outer surface exposed without the barrier 102a, and the shooting lens 103a may prevent other elements of the imaging system (the shutter 101a and imaging unit 22a) from getting contaminated or damaged.

The barrier 102b covers the imaging system (for example the shooting lens 103b, the shutter 101b, and the imaging unit 22b) of the rear camera unit to prevent the imaging system from being contaminated or damaged. The shooting lens 103b is a lens group that includes a zoom lens and a focus lens and is a wide-angle lens. The shutter 101b is a shutter with an aperture function that adjusts the amount of object light entering the imaging unit 22b. The imaging unit 22b is an imaging apparatus including for example a CCD or CMOS device which converts optical images into electrical signals. The A/D converter 23b converts an analog signal output from the imaging unit 22b into a digital signal. The outer surface of the shooting lens 103b may be exposed without the barrier 102b, and the shooting lens 103b may prevent other elements of the imaging systems (such as the shutter 101b and the imaging unit 22b) from getting contaminated or damaged.

Virtual reality (VR) images are captured by the imaging units 22a and 22b. VR images can be displayed in VR view (displayed in the display mode "VR view"). VR images include an omnidirectional image captured by an omnidirectional camera (VR camera) and a panoramic image with an image range wider than the display range (effective image area) which can be displayed on the display unit at one time. VR images include not only still images but also video images and live-view images (images obtained from the camera almost in real time). A VR image has an image range (effective image range) for a field of vision of up to 360° in the vertical direction (a vertical angle, an angle from the zenith, an angle of elevation, an angle of depression, an elevation angle, and a pitch angle) and 360° in the horizontal direction (a horizontal angle, an azimuth angle, and a yaw angle).

VR images also include images with a wider view angle range (field of view) than the view angle that can be captured by a normal camera, or a wider video image range (effective video image range) than the display range which can be displayed on the display unit at one time, even if the range is less than 360° in the vertical and horizontal directions. For example, an image taken with a omnidirectional camera capable of capturing a subject for a field of view (angle of view) of 360° in the horizontal direction (the horizontal angle and the azimuth angle) and a vertical angle of 210° around the zenith is one kind of VR image. For example, an image taken with a camera capable of shooting a subject for a field of view (angle of view) of 180° in the left-right direction (the horizontal angle and the azimuth angle) and a vertical angle of 180° around the horizontal direction is one kind of VR image. In other words, an image which has a field of view of 160° (±80°) or more both in the vertical and horizontal directions and a wider field of view than the range a human can see at a time is one kind of VR image.

When such a VR image is displayed in VR view (displayed in the display mode "VR View") and the attitude of the display device (the display device displaying the VR image) is varied in the left-right rotation direction, the user can view the image in all directions seamlessly in the left-right direction (horizontal rotation direction). In the up-down direction (vertical rotation direction), the user can view a seamless image in all directions within ±105° from the top (zenith), but the range beyond 105° from the top is a blank area where no video image exists. A VR image can also be described as an "image having a video image range, which is at least a part of a virtual space (VR space)".

The VR display (VR view) is a display method (display mode) which can change the display range of the VR image in which the image in the field-of-view range according to the attitude of the display device is displayed. When the user wears a head-mounted display (HMD) as a display device to view a video image, the video image in the field-of-view range corresponding to the direction of the user's face is displayed. For example, assume that at a certain time point in a VR image, a video image with a viewing angle (angle of field) centered around 0° in the left-right direction (a specific direction such as north) and 90° in the up-down direction (90° from the zenith or the horizontal direction) is displayed. When the attitude of the display device is reversed from the state between the front and back (for example when the display surface is changed to face north from south), the display range of the same VR image is changed to a video image with a viewing angle around 180° in the left-right direction (the opposite direction such as south) and 90° in the up-down direction (horizontal direction). When the user turns his/her face from north to south (i.e., turns his/her back) while viewing the HMD, the image displayed on the HMD will also change from the north image to the south image. The VR view can visually provide the user with a sense of immersion, as if the user were in the exact place in the VR image (VR space). A smartphone mounted to the VR goggles (head-mounted adapter) can be one kind of HMD.

The method for displaying the VR image is not limited to the above. Instead of changing the attitude, the display range may be moved (scrolled) in response to user operation on the touch panel or the direction buttons. In the VR display (in the display mode "VR view"), in addition to changing the display range by changing the attitude, the display range may be changed by Touch-Move to the touch panel, dragging operation on the mouse device or pressing the direction buttons.

An image processing unit 24 performs resizing and color conversion processing, such as pixel interpolation and reduction, on data from the A/D converters 23a and 23b or from the memory control unit 15. The image processing unit 24 performs prescribed arithmetic processing using captured image data. The system control unit 50 performs exposure control and ranging control on the basis of calculation results obtained by the image processing unit 24. In this way, through-the-lens (TTL) type auto focus (AF) processing, auto exposure (AE) processing, and flash pre-flash (EF) processing are carried out. The image processing unit 24 further performs prescribed arithmetic processing using the captured image data and performs TTL-based auto white balance (AWB) processing on the basis of the obtained arithmetic results.

The image processing unit 24 performs basic image processing on two images (two fisheye images; two wide-angle images) obtained from the A/D converters 23a and 23b and performs connection image processing to combine the two images that have undergone the basic image processing, a single VR image is produced. The image processing unit 24 performs for example image cropping, enlargement, and distortion correction for VR display of the VR image in live VR view or during playback, and rendering for drawing the processing result to the VRAM of a memory 32.

In the connecting image processing, using one of the two images as a reference image and the other as a comparison image, the image processing unit 24 calculates the amount of shift between the reference image and the comparison image for each area by pattern-matching processing and detects the connecting position for connecting the two images on the basis of the amount of shift for each area. The image processing unit 24 corrects the distortion of each image by geometric transformation, taking into account the detected connecting position and the lens characteristics of each optical system, and converts each image into an image in one omnidirectional image form (VR image form). Then, the image processing unit 24 generates one omnidirectional image (VR image) by combining (blending) the two images in a omnidirectional form. The generated omnidirectional image is, for example, an image using an equirectangular cylindrical view method, and the position of each pixel in the omnidirectional image can be associated with the coordinates on the surface of the sphere (VR space).

Data output from the A/D converters 23a and 23b is written in the memory 32 via the image processing unit 24 and the memory control unit 15, or via the memory control unit 15 without through the image processing unit 24. The memory 32 stores image data obtained by the imaging units 22a and 22b and converted to digital data by the A/D converters 23a and 23b, and image data for output to an external display from the connection I/F 25. The memory 32 has a storage capacity sufficient to store a predetermined number of still images or moving images and sounds for a prescribed time period.

The memory 32 also serves as a memory for displaying images (video memory). The data for image display stored in the memory 32 can be output to an external display from the connection I/F 25. By sequentially transferring and displaying the VR images captured by the imaging units 22a and 22b, generated by the image processing unit 24, and stored in the memory 32 to the external display, the function of an electronic viewfinder is achieved, and live view display (LV display) can be performed. The image displayed in the live view display is hereinafter referred to as the live view image (LV image). The VR image stored in the memory 32 can also be transferred to a wirelessly connected external device (such as a smartphone) via the communication unit 54 and displayed on the external device side for live view display (remote LV display).

The non-volatile memory 56 is a memory as a recording medium that can be electrically erased and recorded such as an EEPROM. In the non-volatile memory 56, constants, programs, etc. for the operation of the system control unit 50 are recorded. The program here refers to a computer program for executing various kinds of processing.

The system control unit 50 has at least one processor or circuit and controls the entire digital camera 100. The system control unit 50 performs various kinds of processing by executing a program recorded in the non-volatile memory 56. The system memory 52 may be a RAM, and for example constants and variables for operation of the system control unit 50 and a program read out from the non-volatile memory 56 are developed in the system memory 52. The system control unit 50 also controls display for example by controlling the memory 32, the image processing unit 24, and the memory control unit 15. The system timer 53 is a time counter unit which measures time used for various kinds of control and the time of a built-in clock.

The mode selecting switch 60, the shutter button 61, the operation unit 70, and the power supply switch 72 are used to input various operating instructions to the system control unit 50.

The mode selecting switch 60 switches the operation mode of the system control unit 50 for example among the following modes, a still image recording mode, a moving image recording mode, a playback mode, and a communication connection mode. The still image recording mode includes an auto shooting mode, an auto scene determining mode, a manual mode, an aperture priority mode (Av mode), a shutter speed priority mode (Tv mode), and program AE mode. There are various scene modes for shooting settings depending on each shooting scene and custom modes. The mode selecting switch 60 allows the user to switch the mode directly to one of these modes. Alternatively, after once switching to a screen indicating a shooting mode list by the mode selecting switch 60, any of other operation members may be used to selectively switch the mode to any of a plurality of modes displayed on the display unit 28. Similarly, a plurality of modes may be included in the moving image shooting mode.

The shutter button 61 includes a first shutter switch 62 and a second shutter switch 64. During the operation of the shutter button 61, the first shutter switch 62 is turned on by so-called half push (shooting preparation instruction) and generates a first shutter switch signal SW1. The system control unit 50 starts shooting preparation operation such as auto focus (AF) processing, auto exposure (AE) processing, auto white balance (AWB) processing, and flash pre-flash (EF) processing in response to the first shutter switch signal SW1.

The second shutter switch 64 is turned on by so-called full push (shooting instruction) when the operation of the shutter button 61 is completed and generates a second shutter switch signal SW2. The system control unit 50 starts a series of shooting processing operations from reading of signals from the imaging units 22a and 22b to writing of image data to the recording medium 90 in response to the second shutter switch signal SW2.

The shutter button 61 is not limited to such an operation member that can be operated in two steps, the full-push and half-push but can also be pushed only in one step. In this, the preparation operation and the shooting processing are performed in succession by pressing the button in the one step. This is the same operation as when the shutter button which can be pushed halfway and fully is pressed fully (when the first shutter switch signal SW1 and the second shutter switch signal SW2 are generated almost simultaneously).

The operation unit 70 acts as various function buttons for functions assigned as appropriate to various scenes by selecting and operating various function icons and options displayed on the display unit 28. The function buttons may include an end button, a return button, an image feed button, a jump button, a refine button, and an attribute change button. For example, when the menu button is pressed, various menu screens which can be set are displayed on the display unit 28. The user can intuitively make various settings by operating the operation unit 70 while viewing the menu screen displayed on the display unit 28.

The power supply switch 72 is a push button for switching between the power on and off states. The power supply control unit 80 may include a battery detecting circuit, a DC-DC converter, and a switch circuit for switching the block to be energized and detect whether or not a battery is installed, the type of battery, and the remaining battery capacity. The power supply control unit 80 controls the DC-DC converter on the basis of the detection result and an instruction from the system control unit 50 and supplies required voltage to each of parts including the recording medium 90 for a required time period. The power supply unit 30 includes a primary battery such as an alkaline battery and a lithium battery, a secondary battery such as a NiCd battery, a NiMH battery, and a Li battery, and an AC adapter.

The recording medium I/F 18 is an interface with the recording medium 90 such as a memory card and a hard disk. The recording medium 90 is a recording medium such as a memory card for recording captured images and includes a semiconductor memory, an optical disk, and a magnetic disk. The recording medium 90 may be an interchangeable recording medium which can be attached to and removed from the digital camera 100 or may be a recording medium built in the digital camera 100.

The communication unit 54 transmits and receives for example video signals and audio signals to and from external devices connected by wireless or wired cables. The communication unit 54 can also be connected to a wireless local area network (LAN) or the Internet. The communication unit 54 can transmit images captured by the imaging units 22a and 22b (including LV images) and images recorded in the recording medium 90 and can receive images and various other kinds of information from external devices.

An attitude detecting unit 55 detects the attitude of the digital camera 100 with respect to the gravitational direction. It can be determined on the basis of the attitude detected by the attitude detecting unit 55 whether an image captured by the imaging unit 22a or 22b is an image captured with the digital camera 100 held horizontally or vertically. It is also possible to determine to what extent an image captured by the imaging unit 22a or 22b is an image captured by tilting the digital camera 100 in the three axial directions (rotational directions), the yaw, pitch, and roll directions. The system control unit 50 can add azimuth information according to the attitude detected by the attitude detecting unit 55 to the image file of a VR image captured by the imaging unit 22a or 22b, or rotating the image (adjusting the orientation of the image so as to correct the tilt (zenith correction)) and recording the result. One sensor or a combination of multiple sensors such as an accelerometer, a gyro sensor, a geomagnetic sensor, an azimuth sensor, and an altitude sensor can be used as the attitude detecting unit 55. Using for example the accelerometer, gyro sensor, or the azimuth sensor which forms the attitude detecting unit 55, the movement of the digital camera 100 (for example pan, tilt, lift, or whether it is stationary).

The microphone 20 collects audio sounds around the digital camera 100 which are recorded as the audio of a VR image (VR video) as a video image. A connection I/F 25 is a connection plug to which for example an HDMI (registered trademark) cable or a USB cable is connected to connect with an external device, so that images are transmitted/received.

Figure 2A:
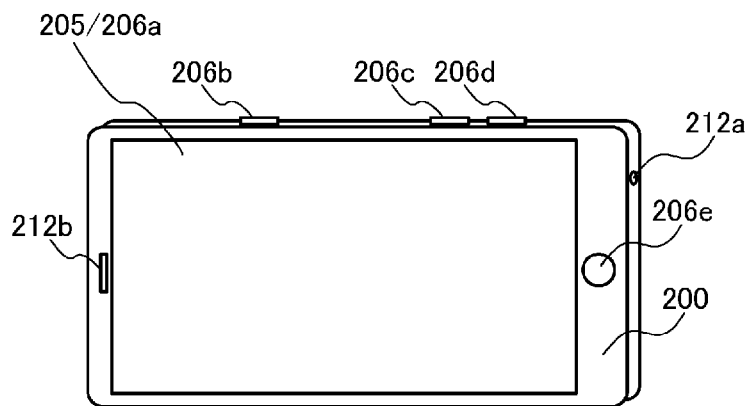
FIGS. 2A to 2C are outside appearance views and a block diagram of an electronic apparatus.

FIG. 2A is an exemplary outside appearance view of a display control apparatus 200 as a kind of an electronic apparatus. The display control apparatus 200 is a display device such as a smart phone. A display 205 is a display unit which displays images and various kinds of information. The display 205 is configured integrally with a touch panel 206a, so that touch operation on the display surface of the display 205 can be detected. The display control apparatus 200 can display VR images (VR contents) in VR view on the display 205. The operation unit 206b is a power button that accepts operation for switching between the on and off states of the power supply for the display control apparatus 200. The operation units 206c and 206d are each a volume button which raises or lowers the volume of audio sound output from a speaker 212b or an earphone or external speaker connected to the audio output terminal 212a. The operation unit 206e is a home button for displaying the home screen on the display 205. An audio output terminal 212a is an earphone jack, which outputs audio signals for example to an earphone and external speaker. The speaker 212b is a speaker built in the main body to output audio sound.

Figure 2B:
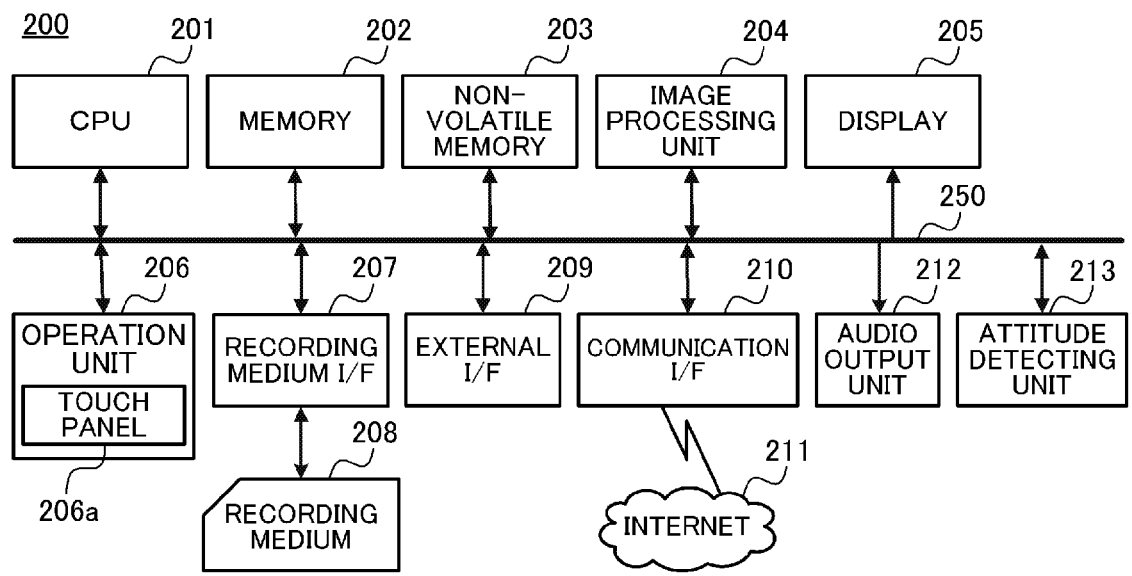

FIG. 2B is a block diagram showing an exemplary configuration of the display control apparatus 200. The CPU 201, the memory 202, the non-volatile memory 203, the image processing unit 204, the display 205, the operation unit 206, a recording medium I/F 207, an external I/F 209, and a communication I/F 210 are connected to an internal bus 250. The audio output unit 212 and the attitude detecting unit 213 are also connected to the internal bus 250. The parts connected to the internal bus 250 can exchange data with each other via the internal bus 250.

The CPU 201 is a control unit that controls the entire display control apparatus 200 and includes at least one processor or circuit. The memory 202 includes, for example, a RAM (for example a volatile memory using semiconductor devices). The CPU 201 controls each part of the display control apparatus 200, for example, according to a program stored in the non-volatile memory 203, using the memory 202 as a work memory. The non-volatile memory 203 stores image data, audio data, other data, and various programs for the CPU 201 to operate. The non-volatile memory 203 consists of, for example, flash memory and ROM.

The image processing unit 204 performs various kinds of image processing on images stored in the non-volatile memory 203 and the recording medium 208, video signals obtained via the external I/F 209, and images obtained via the communication I/F 210 under the control of the CPU 201. The image processing performed by the image processing unit 204 includes A/D conversion processing, D/A conversion processing, image data encoding processing, compression processing, decoding processing, enlargement/reduction processing (resizing), noise reduction processing, and color conversion processing. It also performs various image processing such as panoramic expansion, mapping processing, and conversion of omnidirectional images or VR images, which are wide area images with a wide range of images even if they are not omnidirectional. The image processing unit 204 may be composed of a dedicated circuit block for applying a specific image processing. Also, depending on the type of image processing, the CPU 201 can apply image processing according to a program without using the image processing unit 204.

The display 205 displays images, a GUI screen including a graphical user interface (GUI) under the control of the CPU 201. The CPU 201 generates display control signals according to the program, generates video signals for display on the display 205, and controls each part of the display control apparatus 200 to output the signals to the display 205. The display 205 displays images based on the generated and output video signals. The display control apparatus 200 itself is equipped with an interface for outputting video signals to be displayed on the display 205, and the display 205 may be configured with an external monitor (TV, HMD, etc.).

The operation unit 206 is an input device for receiving user operations and includes a character information input device such as a keyboard, a pointing device such as a mouse device and a touch panel, a button, a dial, a joystick, touch sensors, and a touch pad. According to the embodiment, the operation unit 206 includes the touch panel 206a, and operation units 206b, 206c, 206d, and 206e.

A recording medium 208 such as a memory card, CD, or DVD can be attached to and removed from the recording medium I/F 207. The recording medium I/F 207 reads/writes data from/to the mounted recording medium 208 under the control of the CPU 201. The recording medium 208 stores data such as images to be displayed on the display 205. An external I/F 209 is an interface for connecting to external devices by a wired cable (for example USB cable) or wirelessly, and for inputting and outputting video and audio signals (data communication). The communication I/F 210 is an interface for communicating (wireless communication) with external devices and the Internet 211 to send and receive (data communication) various data such as files and commands.

The audio output unit 212 outputs the sound of video and music data played by the display control apparatus 200, operation sounds, ring tones, and various notification sounds. The audio output unit 212 shall include an audio output terminal 212a for connecting an earphone or the like, and a speaker 212b, but the audio output unit 212 may also output audio data to an external speaker by wireless communication or the like.

The attitude detecting unit 213 detects the attitude (tilt) of the display control apparatus 200 with respect to the direction of gravity and the attitude of the display control apparatus 200 with respect to each axis of the yaw, pitch, and roll directions, and notifies the attitude information to the CPU 201. Based on the attitude detected by the attitude detecting unit 213, it is possible to determine whether the display control apparatus 200 is held horizontally, vertically, upwardly, downwardly, or in an oblique attitude. It is also possible to determine whether or not the display control apparatus 200 is tilted in a rotational direction such as the yaw, pitch, or roll direction, the size of the tilt, and whether or not the display control apparatus 200 has been rotated in said rotational direction. One sensor or a combination of multiple sensors, such as an accelerometer, a gyro sensor, a geomagnetic sensor, an azimuth sensor, and an altitude sensor, can be used as the attitude detecting unit 213.

As described above, the operation unit 206 includes the touch panel 206a. The touch panel 206a is an input device formed on the display 205 to have a flat surface and configured to output coordinate information about the position where it is touched. The CPU 201 can detect the following kinds of operation on the touch panel 206a or states.

A new touch on the touch panel 206a by a finger or pen which has not touched the touch panel 206a, in other words, the start of touching (hereinafter referred to as "Touch-Down").

The state in which a finger or pen keeps touching the touch panel 206a (hereinafter referred to as "Touch-On").

The state in which the touch panel 206a moves while a finger or pen touches the touch panel 206a (hereinafter referred to as "Touch-Move").

The state in which a finger or pen which has touched the touch panel 206a is apart from the touch panel 206a, in other words, the end of touching (hereinafter referred to as "Touch-Up").

The state in which nothing touches the touch panel 206a (hereinafter referred to as "Touch-Off").

When a Touch-Down is detected, a Touch-On is detected at the same time. After the Touch-Down, the Touch-On usually continues to be detected unless a Touch-Up is detected. When a Touch-Move is detected, a Touch-On is detected at the same time. When a Touch-On is detected, a Touch-Move is not detected unless the touch position is moved. After a Touch-Up is detected for all the fingers or a pen which has touched, a Touch-Off is detected.

These kinds of operation/states and the position coordinates at which the finger or pen touches the touch panel 206a are notified to the CPU 201 through the internal bus, and the CPU 201 determines which kind of operation (touch operation) has been performed on the touch panel 206a on the basis of the notified information. As for a Touch-Move, the moving direction of the finger or pen moving on the touch panel 206a can be determined for each of the vertical and horizontal components on the touch panel 206a on the basis of changes of the position coordinates. When a Touch-Move for a prescribed distance or longer is detected, it is determined that sliding operation has been performed. The Touch-Move is moving operation performed on the touch panel 206a by the user. Various kinds of processing performed in response to the Touch-Move in the following description can also be performed in response to drag operation using a mouse device, which is also moving operation.

The operation of moving a finger quickly for a certain distance while keeping the finger touching the touch panel 206a and then releasing the finger is called a flick. In other words, a flick is the operation of quickly tracing the touch panel 206a as if flicking the panel with a finger. When a Touch-Move for at least a predetermined distance and at least at a predetermined speed is detected, and then a Touch-Up is detected directly, it can be determined that a flick has been performed (it can be determined that sliding operation has been followed by a flick).

Touch operation to simultaneously touch multiple positions (for example, two positions) and bring these touching positions close to each other is referred to as a "pinch-in", and touch operation to move these touching positions apart from each other is referred to as a "pinch-out". A pinch-out and a pinch-in are collectively referred to as pinch operation (or simply referred to as a "pinch"). The touch panel 206a may be any of various types of panels including a resistance film type, a capacitance type, a surface acoustic wave type, an infrared-ray type, an electromagnetic induction type, an image recognition type, and an optical sensor type. A touch is detected when a finger or pen comes into contact with the touch panel or when the finger or pen comes close to the touch panel, and either of the types can be used.

Figure 2C:
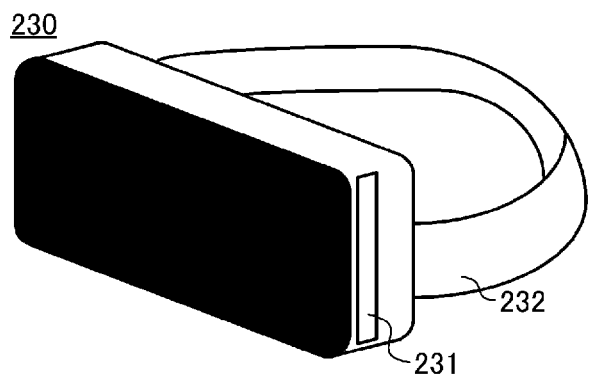

FIG. 2C is an outside appearance view of VR goggles (a head mount adapter) 230 which can be mounted with a display control apparatus 200. The display control apparatus 200 can also be used as a head mount display when mounted to the VR goggles 230. An insert opening 231 is an insert opening for inserting a display control apparatus 200. The entire display control apparatus 200 may be plugged into the VR goggles 230 while the display surface of the display 205 is made to face toward a head band 232 side (or the user side) for securing the VR goggles 230 to the user's head. The user can view the display 205 without holding the display control apparatus 200 with the hand while the VR goggles 230 mounted with the display control apparatus 200 is mounted on the head. In this case, when the user moves the head or the entire body, the attitude of the display control apparatus 200 also changes. The attitude detecting unit 213 detects the attitude change of the display control apparatus 200 at the time, and the CPU 201 performs processing for VR display on the basis of the attitude change. In this case, the detection of the attitude of the display control apparatus 200 by the attitude detecting unit 213 is equivalent to detecting the attitude of the user's head (the direction in which the user's eyes face). The display control apparatus 200 itself may be an HMD which can be mounted on the head without VR goggles.

Video Shooting and Playback Processing

Hereinafter, a series of processing steps from video image recording to playback according to the first embodiment will be described with reference to FIG. 3. According to the first embodiment, when a plurality of video images are successively played back, the display control apparatus 200 as an electronic apparatus reproduces a reference direction set by the user in one video image in other video images, so that the reference direction in the video images is aligned and played back. Each video image is, for example, an omnidirectional image which is played successively in an order specified by the user. In the description with reference to FIG. 3, each video image is described as a moving image but may not be limited to a moving image and may be a still image. A still image is composed of one image, while a moving image includes multiple (frames) images generated at a predetermined frame rate.

Figure 3:
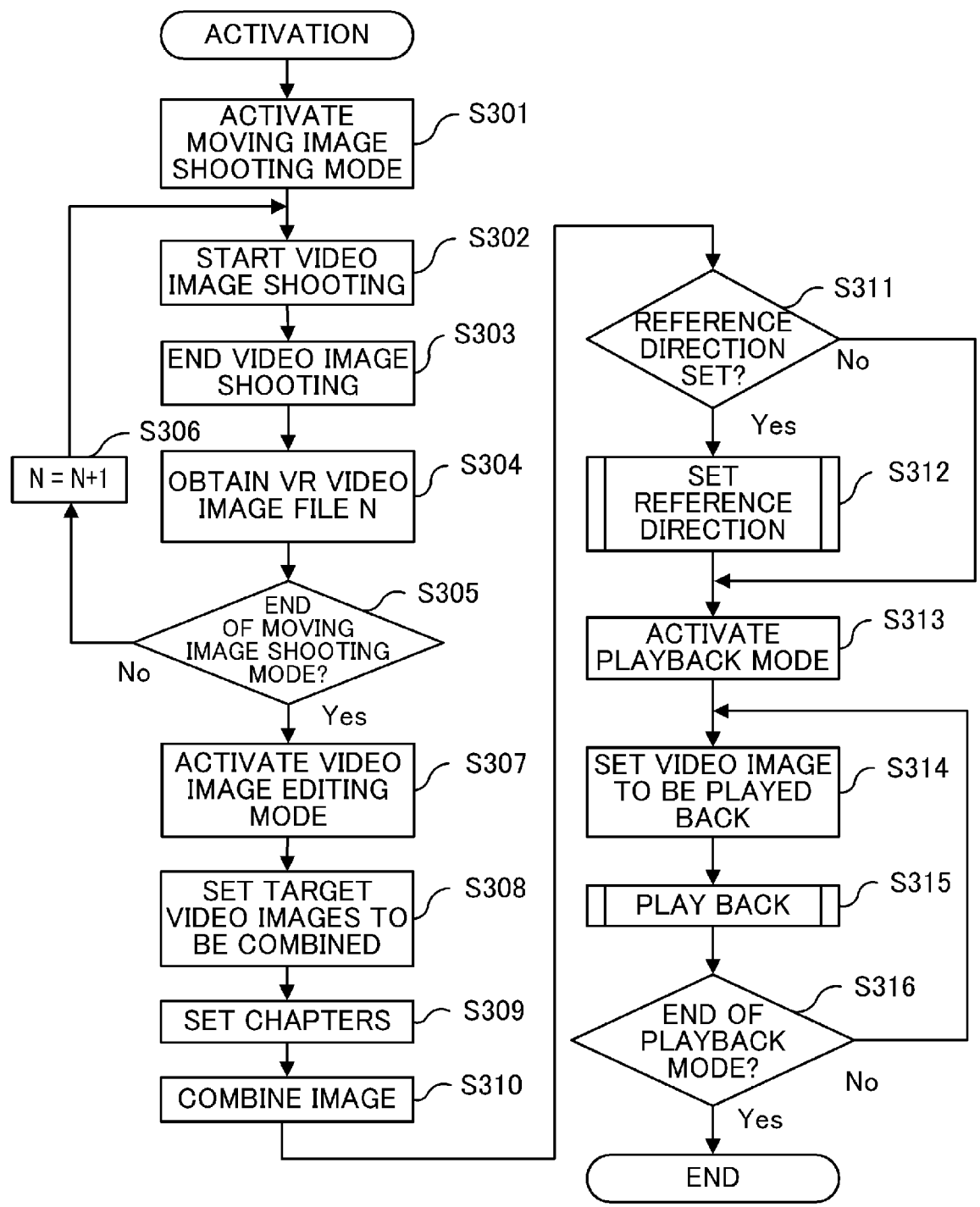
FIG. 3 is a flowchart for illustrating video image shooting and playback processing.

The processing illustrated in FIG. 3 is carried out as a program recorded in the non-volatile memory 203 is developed in the memory 202 and executed by the CPU 201. In the processing in FIG. 3, the display control apparatus 200 may take video images by remotely controlling the wirelessly connected digital camera 100. The video image recording and playback processing in FIG. 3 starts, for example, when the power supply for the digital camera 100 and the display control apparatus 200 is turned on and the display control apparatus 200 is switched to the control mode for the digital camera 100.

The display control apparatus 200 switches the mode to the control mode for the digital camera 100, for example, by activating a dedicated application for controlling the digital camera 100. The control mode for the digital camera 100 in the display control apparatus 200 includes a moving image recording mode for controlling shooting of video images using the digital camera 100, an image editing mode for combining images, and a playback mode for playing back video images.

In S301, the CPU 201 activates the video image shooting mode for controlling shooting of video images using the digital camera 100 connected by communication. In S302, the CPU 201 transmits, to the digital camera 100, a control signal for starting video image shooting via the communication I/F 210. Upon receiving the control signal from the display control apparatus 200 through the communication unit 54, the system control unit 50 of the digital camera 100 starts taking a video image. The digital camera 100 captures a 360° VR video image (omnidirectional video image) using the shooting lenses 103a and 103b.

In S303, the CPU 201 transmits, to the digital camera 100, a control signal for ending shooting the video image through the communication I/F 210. Upon receiving the control signal from the display control apparatus 200 through the communication unit 54, the system control unit 50 of the digital camera 100 ends shooting the video image. After the end of the video image shooting, the digital camera 100 generates a VR video image file N. The digital camera 100 can record positional information and azimuth information obtained during the shooting in the VR video image file N.

In S304, the CPU 201 obtains the video image file generated by the digital camera 100 in S303 through the communication I/F 210. In the processing illustrated in FIG. 3, the display control apparatus 200 receives the video image after the end of the video image shooting but may obtain the video image in timing specified by the user.

In S305, the CPU 201 determines whether operation to end the moving image recording mode has been performed by the user. For example, the user may switch the mode of the digital camera 100 to end the video recording mode through the dedicated application for controlling the digital camera 100. When the user ends the moving image recording mode, the process proceeds to S307. When there is no operation to end the moving image recording mode from the user, the process proceeds to S306.

When the operation for ending the moving image recording mode is performed by the user in S305, the CPU 201 transmits a control signal to the digital camera 100 for ending the moving image recording mode via the communication I/F 210. Upon receiving the control signal for ending the moving image recording mode through the communication unit 54, the system control unit 50 of the digital camera 100 ends the moving image recording mode.

In S306, CPU 201 adds 1 to a variable N. The variable N is, for example, a number used to identify a plurality of video images captured by the digital camera 100. Each video image captured is provided with the value of the variable N to its file name and recorded in an identifiable manner on the recording medium 208.

In S307, the CPU 201 activates the video editing mode in which a plurality of video images obtained in S302 to S306 are combined according to user operation. In S308, the CPU 201 sets video images selected by the user by the touch panel 206a as video images to be combined. The image composition in S307 to S310 refers to connecting multiple video images together in order to continuously play back the images.

In S309, the CPU 201 sets a chapter according to user operation for the video images selected in S308. The order in which the video images selected in S308 are connected is determined by the chapter setting. For example, when chapters 3, 1, and 2 are set for video images A, B, and C, respectively, these video images are connected together in the order of video image B, the video image C, and the video image A.

In S310, the CPU 201 generates a composite video image file of the multiple video images with the chapter setting in S309 combined in the order of chapters set in S309. In S308, when the user selects one video image, a video image file is generated for playing the selected video image by itself.

In S311, the CPU 201 determines whether the user has set a reference direction. When the user sets the reference direction, the process proceeds to S312, and when the reference direction is not set, the process proceeds to S313. The reference direction serves as a reference for a display range to be displayed when a video image starts playing. The reference direction may be, for example, the front direction of the shooting lens 103a of the digital camera 100. In this case, when a video image shot with the digital camera 100 is played back, a scene in the front direction of the shooting lens 103a is first displayed on the display 205 of the display control apparatus 200.

In S312, the CPU 201 performs processing for setting the reference direction. The processing for setting the reference direction is processing for changing the reference direction set in the front direction of the shooting lens 103a of the digital camera 100 for each of the video images selected in S308. Details of the processing for setting the reference direction will be described with reference to FIGS. 4, 5A, and 5B. In S312, a display range (a certain area) is set by setting the reference direction, but there may be an alternative way. The CPU 201 may specify a range for each of the video images to set a display range.

In S313, the CPU 201 activates the playback mode in which a video image stored in the non-volatile memory 203 or the recording medium 208 is played.

In S314, the CPU 201 sets a video image selected by the user by the touch panel 206a as the video image to be played. In S315, the CPU 201 performs video image playback processing. Details of the video image playback processing will be described with reference to FIG. 7.

In S316, the CPU 201 determines whether operation to end the playback mode has been performed by the user. When operation to end the playback mode has been performed by the user, the processing shown in FIG. 3 ends. If there is no operation to end the playback mode performed by the user, the process returns to S314.

Figure 4:
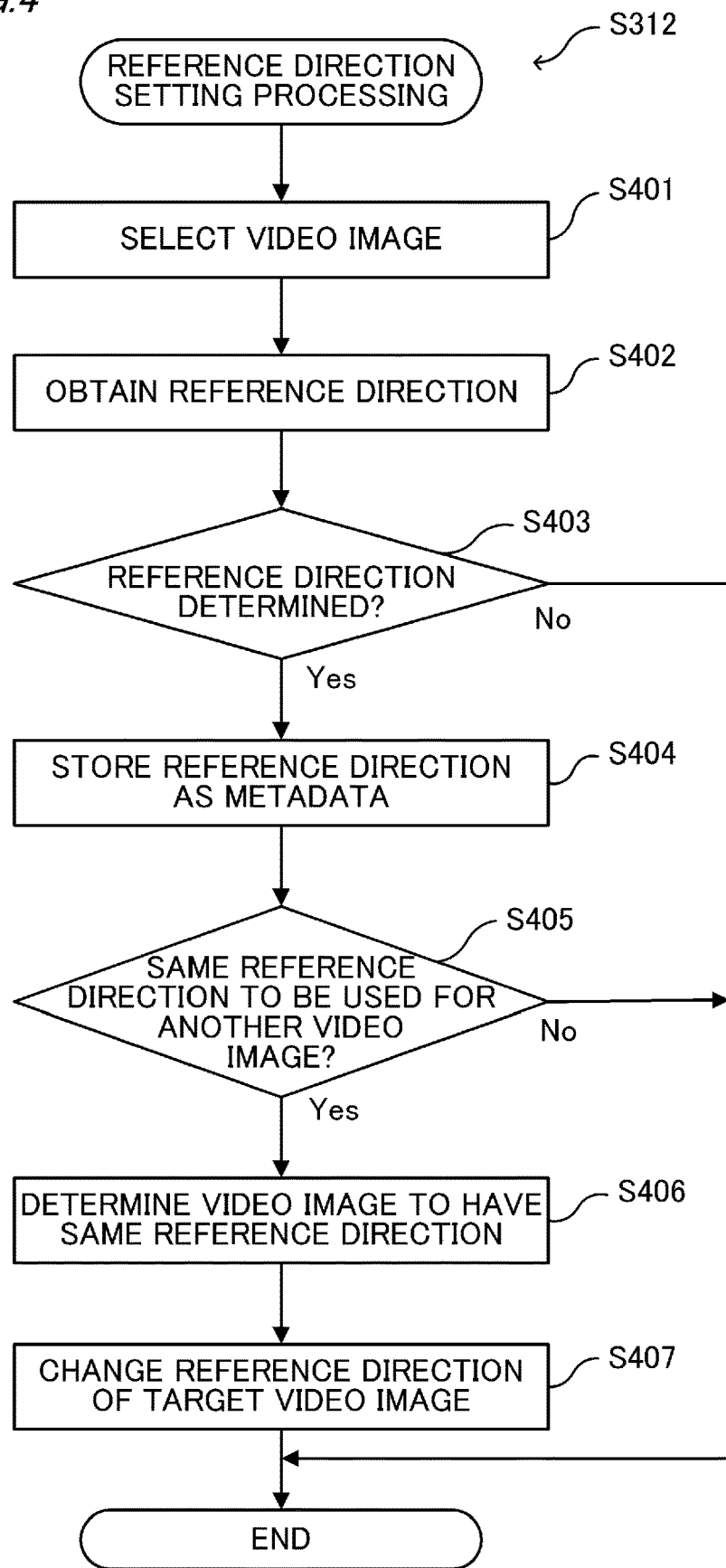
FIG. 4 is a flowchart for illustrating reference direction setting processing by an electronic apparatus according to a first embodiment of the invention.

FIG. 4 is a flowchart for illustrating reference direction setting processing by the display control apparatus 200. The reference direction is used to determine a display range (a region corresponding to a part of the total angle of view of the video image) displayed on the display 205 when the video (image) starts playing. The display range of the video image may be, for example, a region within a range that can be displayed on the display 205 around the reference direction.

The chart showing the reference direction setting processing in FIG. 4 is detailed illustration of S312 in FIG. 3. The reference direction setting processing is carried out as a program recorded in the non-volatile memory 203 is developed in the memory 202 and executed by the CPU 201. The processing starts when the power supply for the display control apparatus 200 is turned on and a reference direction is set for an image selected by the user.

In S401, the CPU 201 selects a video image for which a reference direction is to be set. Here, the video image for which the reference direction is set is regarded as one of video images provided on the playback timeline in the image editing mode.

In S402, the CPU 201 obtains the reference direction set by the user in S311 in FIG. 3 from the operation unit 206. The reference direction is determined by specifying an angle from the front direction assuming that the front direction of the shooting lens 103a is at an azimuth angle of 0° and an elevation angle of 0°. The user can set the reference direction, for example, by dragging a pointer indicating the reference direction in the entire angle of view of an omnidirectional image or by specifying a rotation angle for the shooting lens 103a from the front direction. The user can determine the angle of view to be displayed on the display 205 and set the display range of the omnidirectional image by setting the reference direction.

Figure 5A:
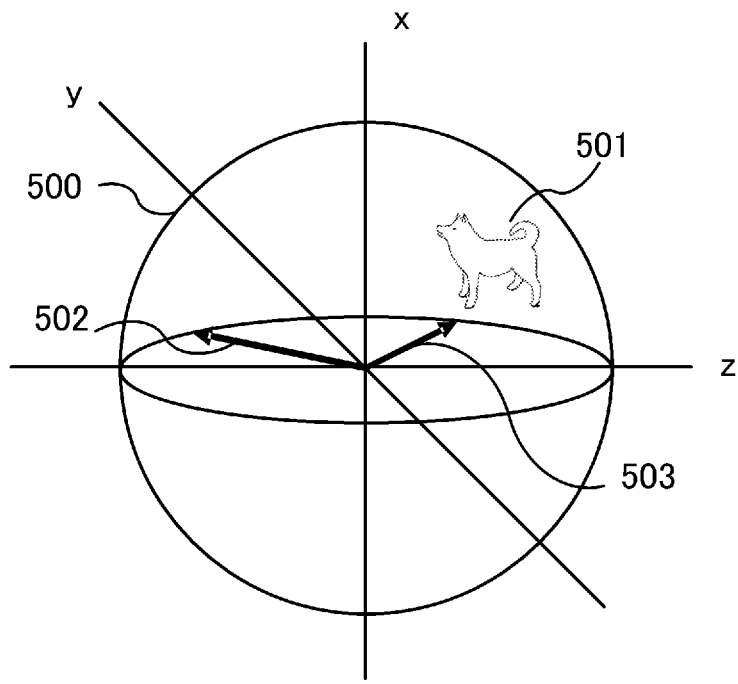
FIGS. 5A and 5B are diagrams for illustrating how a reference direction is set in an omnidirectional video image.
Figure 5B:
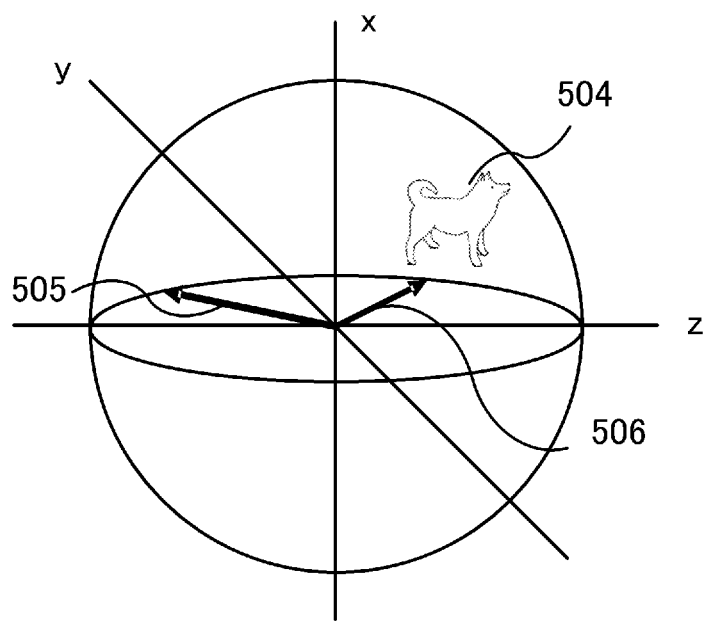

Here, the setting of the reference direction in the omnidirectional image will be described with reference to FIG. 5A. FIGS. 5A and 5B show the concept of how a reference direction is set in an omnidirectional image. FIG. 5A shows a set image in the reference direction in a video image as a reference direction setting target. In FIG. 5A, a virtual space 500 in the omnidirectional image is depicted in the xyz coordinate system. The arrows 502 indicates the default reference direction. The arrow 503 shows the reference direction set by the user in S311 in FIG. 3. The reference direction set by the user points to the direction of a shot subject 501.

The user may set the reference direction by specifying a rotation angle in the horizontal direction (the circumferential direction of the yaw axis) and a rotation angle in the vertical direction (the circumferential direction of the pitch axis) from the default reference direction (the arrow 502). The reference direction may be set by specifying coordinates according to the xyz coordinate system.

Figure 6A:
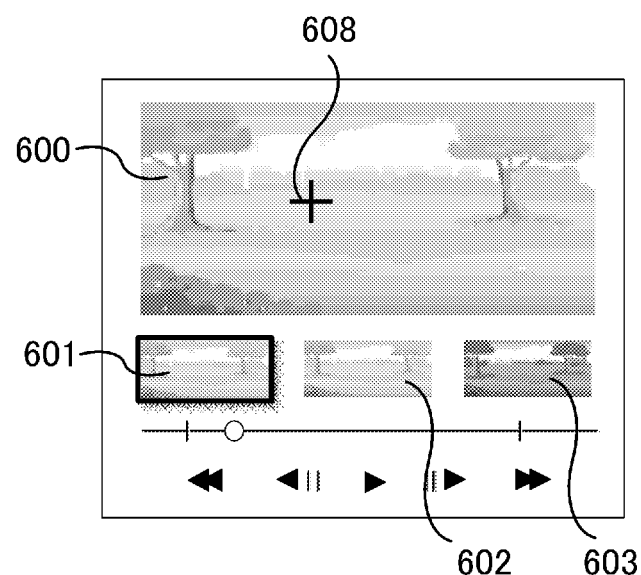
FIGS. 6A and 6B are examples of display in video image editing mode.
Figure 6B:
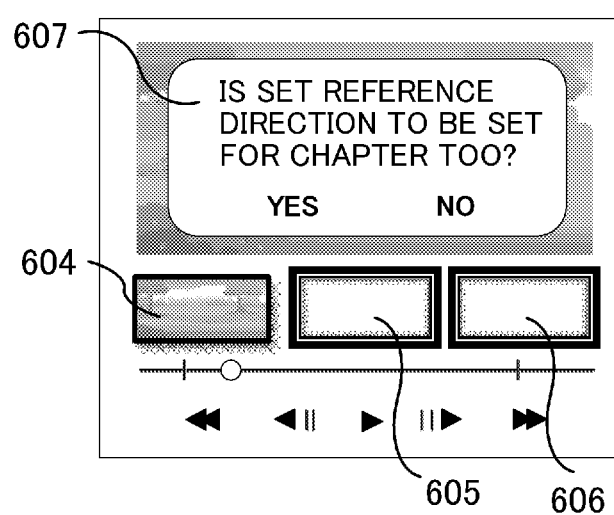

Referring to FIGS. 6A and 6B, how a video image (a first omnidirectional video image) to be set as the reference direction setting target is selected will be described. FIGS. 6A and 6B shows an exemplary editing screen for an omnidirectional image displayed on the display 205 in the video image editing mode. FIG. 6A is an exemplary display of the screen for setting the reference direction for a video image as the reference direction setting target.

A video image 600 indicates a video image selected as the reference direction setting target. Also, thumbnail images 601 to 603 are placed on the playback timeline as an omnidirectional video image to be played. The thumbnail 601 is a video image selected as a first omnidirectional video image and is highlighted as it is enclosed in a thick frame. The thumbnails 602 and 603 show other video images (a second omnidirectional video image) for which the reference direction of the first omnidirectional video image is replicated. A pointer 608 indicates the reference direction specified by the user for the video image 600.

In S403 in FIG. 4, the CPU 201 determines whether the reference direction has been determined through the operation unit 206. The reference direction is determined, for example, as the user drags the pointer 608 and makes determination operation. When the reference direction is determined, the process proceeds to S404, and when it is not determined, the processing ends.

In S404, the CPU 201 stores (records) information about the determined reference direction as metadata on the video image as the reference direction setting target selected in S401. The information about the reference direction may be the absolute direction (azimuth information) of the reference direction relative to the shooting position.

In S405, the CPU 201 determines whether the same reference direction as the video image as the reference direction setting target (the first omnidirectional video image) is used in other images (the second omnidirectional video image). The second omnidirectional video image is a video image other than the video image selected in S401 among the video images selected for composition in S309 in FIG. 3. When the same reference direction as the first omnidirectional video image is used in the second omnidirectional video image, the process proceeds to S406, and when the same reference direction is not used in the second omnidirectional video image, the processing ends.

Note that whether to use the same reference direction as the first omnidirectional video image in the second omnidirectional video image is instructed by user operation. The CPU 201 may let the user instruct whether to use the same reference direction as the first omnidirectional video image in the second omnidirectional video image when the composite video image is written into a file in step S310 in FIG. 3.

In S406, the CPU 201 determines a video image for which the same reference direction as the first omnidirectional video image is replicated. A video image for which the same reference direction is replicated may be an omnidirectional video image which is not the first omnidirectional video image among the multiple video images provided on the playback timeline in the video editing mode.

Referring now to FIGS. 6A and 6B, operation for selecting a video image for which the same reference direction as the first omnidirectional video image is replicated will be described. The thumbnails 602 and 603 are thumbnails of the second omnidirectional video image for which the reference direction of the thumbnail 601 is replicated.

FIG. 6B is an exemplary display for confirming with the user whether the same reference direction is set in the second omnidirectional video image when the reference direction is set in the first omnidirectional video image in FIG. 6A. The thumbnail 604 is a thumbnail of a video image with the reference direction set by user operation. The thumbnails 605 and 606 are video images selected by the user as targets for which same reference direction as the video image of the thumbnail 604 is replicated and are highlighted as the thumbnails are enclosed in a bold frame.

Message 607 is a message for confirming with the user whether the reference direction set in FIG. 6A is to be set in the video image corresponding to the thumbnails 605 and 606. When "Yes" is pressed, the CPU 201 determines the user-selected video images as targets for which the same reference direction as the video image of the thumbnail 604 is set. The CPU 201 may determine the video images selected by the user to be targets for which the same reference direction as the image of the thumbnail 604 is set without displaying the message 607 (or without confirming with the user).

In S407 in FIG. 4, the CPU 201 changes the reference direction of the second omnidirectional video image determined in S406 to the same direction as the reference direction stored in the metadata in S404. The CPU 201 stores the changed reference direction as metadata for each of the video images. In this way, the display range of the second omnidirectional video image is set to the same range as the first omnidirectional video image selected by the user in S401.

In S405, when it is determined that the same reference direction as the first omnidirectional video image is used in the second omnidirectional video image, and then the reference direction of the first omnidirectional video image is changed, the CPU 201 changes the reference direction of the second omnidirectional video image to the same reference direction.

Here, with reference to FIG. 5B, an example of how the reference direction of the second omnidirectional video image is changed to the same direction as the reference direction of the first omnidirectional video image set by the user will be described. FIG. 5B shows different scenes shot at the same position as in FIG. 5A.

The arrows 505 indicates the default reference direction. The arrow 506 represents the same direction as the reference direction (the arrow 503) set by the user in FIG. 5A. The arrow 506 points the direction of the subject 504 taken while the subject 501 in FIG. 5A turned. In this way, by setting the same reference direction in the different scenes (video images), the deviation of the angle of viewing can be reduced when the video images are switched.

Note that the video image for which the reference direction is replicated in the image editing mode may be a still image or a moving image. In addition, the processing for determining a video image for which the same reference direction as the first omnidirectional video image is replicated in S406 may be performed before selecting the first omnidirectional video image in S401. The processing for determining a video image for which the same reference direction is replicated may be performed when the reference direction setting is determined in S403 and the video image editing is completed. The video image for which the same reference direction is replicated may be an arbitrary video image selected by the user from among the multiple video images provided on the playback timeline or may be all the video images other than the first selected omnidirectional image.

Figure 7:
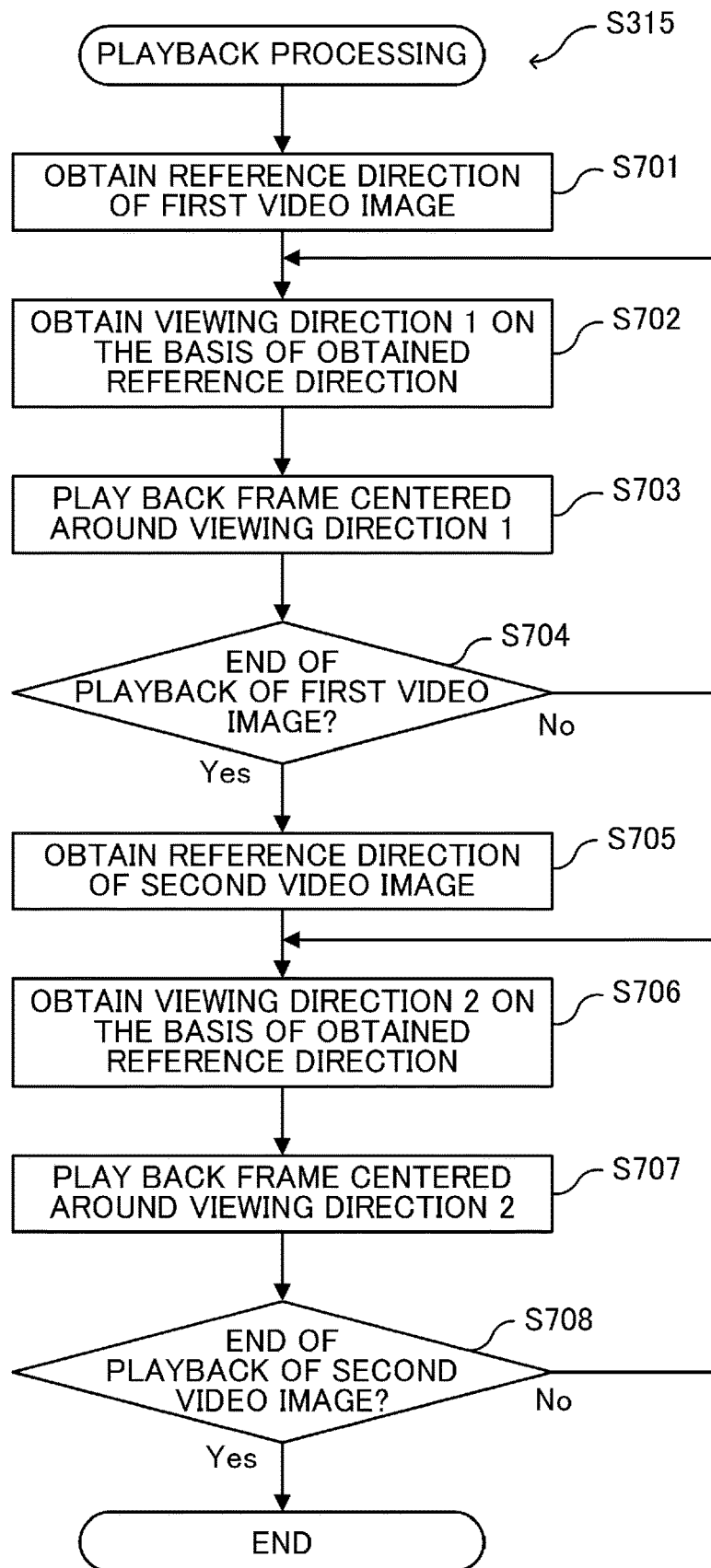
FIG. 7 is a flowchart for illustrating playback processing by the electronic apparatus according to the first embodiment.

FIG. 7 is a flowchart for illustrating playback processing by the display control apparatus 200. The chart showing the playback processing in FIG. 7 is detailed illustration of S315 in the video image shooting and playback processing in FIG. 3. FIG. 7 illustrates an example of how two successive video images are played back on the basis of the reference direction set in the processing in FIG. 4. The viewing direction (display direction) of the video image is corrected by attitude information obtained from the attitude detecting unit 213.

The processing in FIG. 7 is carried out as a program recorded in the non-volatile memory 203 is developed in the memory 202 and executed by the CPU 201. The processing in FIG. 7 starts for example as the CPU 201 reads a video image file captured by the digital camera 100.

In S701, the CPU 201 obtains the reference direction of the first omnidirectional video image from the metadata in the video image file of the first omnidirectional video image. In the S702, the CPU 201 obtains the viewing direction 1 of the user on the basis of the obtained reference direction of the first omnidirectional video image and the attitude information obtained from the attitude detecting unit 213. In S703, the CPU 201 plays a frame around the viewing direction 1 in the entire angle of view of the first omnidirectional video image.

In S704, the CPU 201 determines whether playback of the first omnidirectional video image has been completed. When playback of the first omnidirectional video image is completed, the process proceeds to S705, otherwise the process returns to S702.

In S705, the CPU 201 obtains the reference direction of the second omnidirectional video image from the metadata in the video image file of the second omnidirectional video image. When the reference direction of the first omnidirectional video image is to be replicated for the second omnidirectional video image, the reference direction of the second omnidirectional video image is the same as that of the first omnidirectional video image.

In S706, the CPU 201 obtains the viewing direction 2 of the user on the basis of the obtained reference direction of the second omnidirectional video image and the attitude information obtained from the attitude detecting unit 213. In S707, the CPU 201 plays a frame around the viewing direction 2 in the entire angle of view of the second omnidirectional video image.

In S708, the CPU 201 determines whether playback of the second omnidirectional video image has been completed. When playback of the second omnidirectional video image has been completed, the processing ends, and when the playback has not been completed, the process returns to S706.

In the playback processing illustrated in FIG. 7, the CPU 201 determines the viewing direction of each of the video images on the basis of the reference direction information added as the metadata and the attitude information detected by the attitude detecting unit 213. Therefore, the reference direction of each of the video images is corrected by the attitude information, and the deviation in the front direction among the video images is reduced.

When the reference direction is changed on the basis of the first omnidirectional video image, the CPU 201 may change the display form of the index indicating the reference direction. For example, the CPU 201 displays a black arrow when the reference direction has not been changed, a gray arrow indicating the reference direction before the change, and a red arrow indicating the reference direction after the change. As the reference direction before the change and the reference direction after the change are displayed in different manners, the user can see that the current reference direction is different from the reference direction during the shooting.

In the processing described with reference to FIG. 3, the reference direction of the second omnidirectional video image to be combined is changed (corrected) on the basis of the first omnidirectional video image for which the reference direction is set by the user. When the second omnidirectional video image is played successively with the first omnidirectional video image, the second omnidirectional video image is played on the basis of the corrected reference direction, but when the video images are played independently, the second omnidirectional video image may be played back on the basis of the reference direction before correction (during the shooting).

When the user attitude is significantly changed after playback of the first omnidirectional video image for which the reference direction is set by the user, the second omnidirectional video image may be played on the basis of the reference direction before correction (during the shooting) rather than on the basis of the corrected reference direction.

Second Embodiment

The first embodiment relates to replication of a reference direction when a video image including a plurality of chapters (video images) is played back. Meanwhile, according to a second embodiment of the invention, the display control apparatus 200 determines the display range of the next VR video image on the basis of the display range at the end of playback of the last VR video image (omnidirectional image).

Hereinafter, the playback processing according to the second embodiment will be described with reference to FIG. 8 to FIGS. 14A to 14J. According to the second embodiment, when a video image including a plurality of chapters is played, the display range viewed by the user at the end of playback of the N-th chapter N (the first omnidirectional video image) is passed on to the next chapter N+1 (the second omnidirectional video image) to be played successively. The display control apparatus 200 can take over the display range between the chapters by changing the setting of the reference direction of the next chapter N+1.

The second embodiment will be more specifically described with reference to Examples 1 to 3. In the following examples, the display control apparatus 200 controls the display range in the circumferential direction of the yaw axis by changing the reference direction of the chapter N+1.

In Example 1, the reference direction of the chapter N+1 is changed using the azimuth information held (recorded) as the metadata of each chapter. In Example 2, the reference direction of the chapter N+1 is changed using a common subject (matching subject) extracted from images in each chapter when the azimuth information about the chapter is not held as metadata. In Example 2, the matching subject is not limited to a still subject such as a building or mountain but a dynamic subject such as a person or an animal may also be used as the matching subject. In Example 3, the reference direction of the chapter N+1 is changed using a matching subject excluding a person and an animal.

Example 1

In Example 1, the reference direction of the chapter N+1 is changed using azimuth information held as metadata in the video image file of each chapter. The azimuth information is the reference direction at the time of shooting or the absolute direction of the reference direction set by the user.

Figure 8:
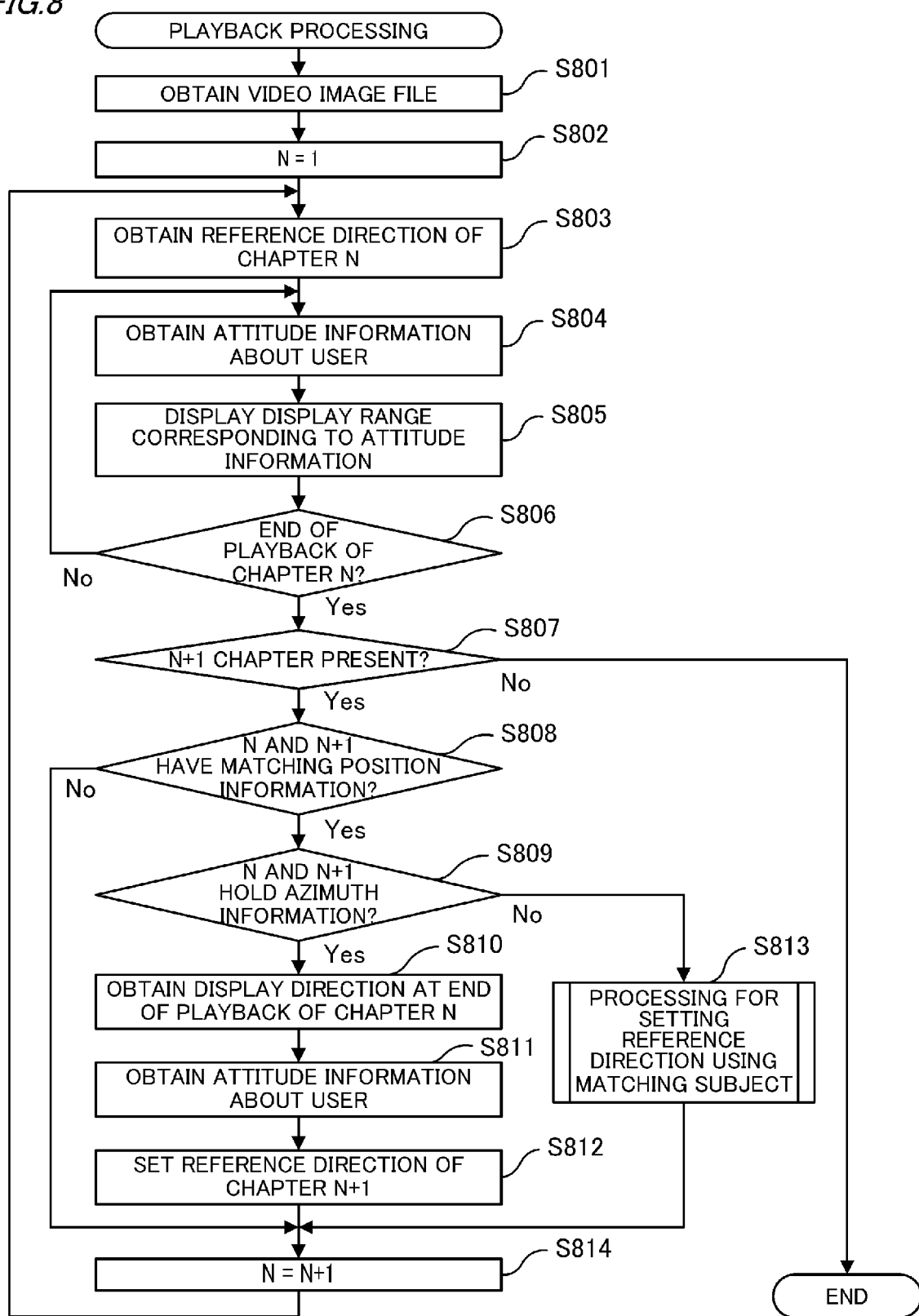
FIG. 8 is a flowchart for illustrating processing for playing back a VR video image according to a second embodiment of the invention.

FIG. 8 is a flowchart for illustrating processing for playing back a VR video image including a plurality of chapters by the display control apparatus 200. The processing illustrated in FIG. 8 is carried out as a program recorded in the non-volatile memory 203 is developed in the memory 202 and executed by the CPU 201. The processing starts when the power supply for the display control apparatus 200 is turned on and the user performs operation for playing back the video image.

In S801, the CPU 201 obtains the video image file of the VR video image to be played back. The CPU 201 reads and obtains the image file to be displayed (played back) from the recording medium 208 or the communication destination via the communication I/F 210. The CPU 201 obtains information indicating the video image range (effective image range) attached to the VR video image as attribute information and displays the VR video image on the display 205 in a flat display which includes the effective image range in a rectangle shape.

In S802, the CPU 201 initializes the variable N for identifying each chapter to 1. In S803, the CPU 201 obtains the reference direction of the chapter N. The CPU 201 can obtain information about the reference direction of the chapter N from the metadata stored in the video image file. In S804, the CPU 201 obtains user attitude information. The attitude information is detected by the attitude detecting unit 213. In S805, the CPU 201 displays (plays back) a display range according to the reference direction of the chapter N and the user attitude information.

Here, the shooting environment and the display range will be described with reference to FIGS. 10A and 10B to FIGS. 12A and 12B. FIGS. 10A and 10B to FIGS. 12A and 12B are diagrams for illustrating the display range of a VR video image.

Figure 10A:
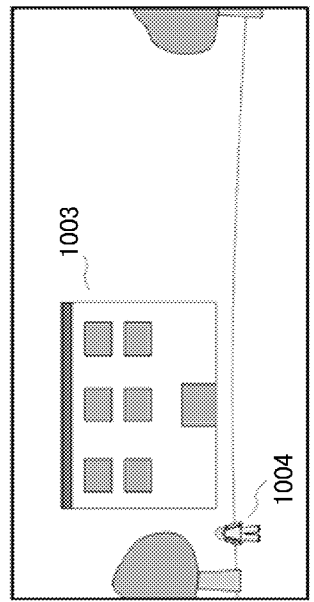
FIGS. 10A and 10B are views for illustrating the display range of a VR video image.
Figure 10B:
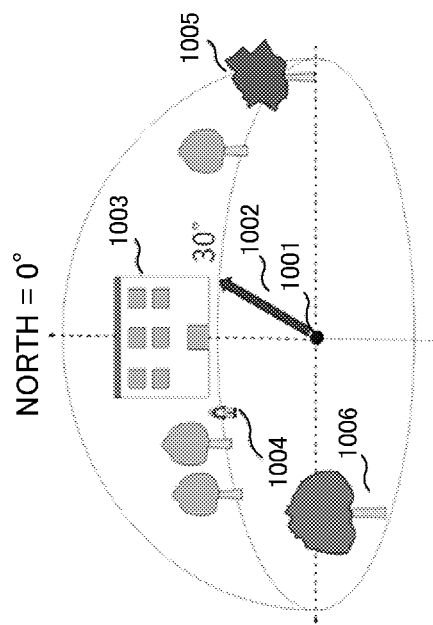

FIG. 10A shows the environment in which a VR video image of one spring scene starts to be taken. The VR video image was taken as the digital camera 100 was installed in a shooting location 1001 and the shooting lens 103*a* was directed to a shooting direction 1002. FIG. 10B shows a video image to be displayed first when the video image is played back on the display 205 of the display control apparatus 200.

Figure 11B:
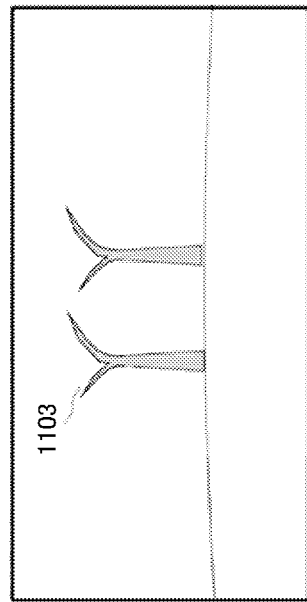
FIGS. 11A and 11B are views for illustrating the display range of a VR video image.
Figure 11A:
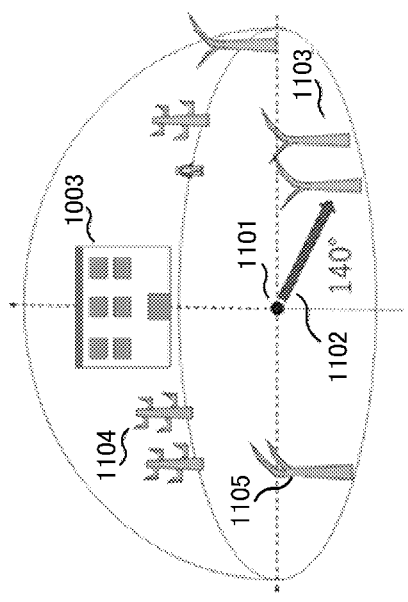

FIG. 11A shows the environment in which a VR video image of one autumn scene starts to be taken. This VR video image was taken as the digital camera 100 was installed in a shooting location 1101 and the shooting lens 103*a* was directed to a shooting direction 1102. FIG. 11B shows a video image to be displayed first when the video image is played back on the display 205 of the display control apparatus 200.

Figure 12B:
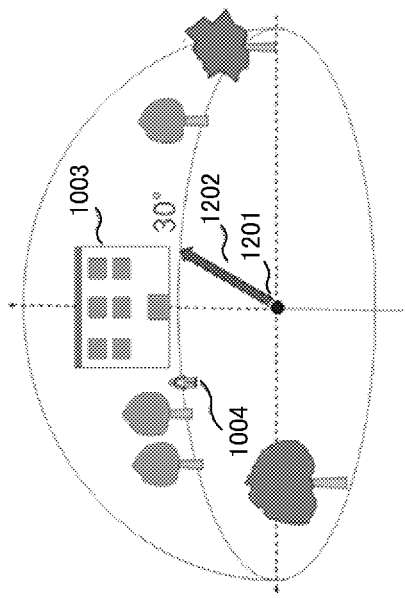
FIGS. 12A and 12B are views for illustrating the display range of a VR video image.
Figure 12A:
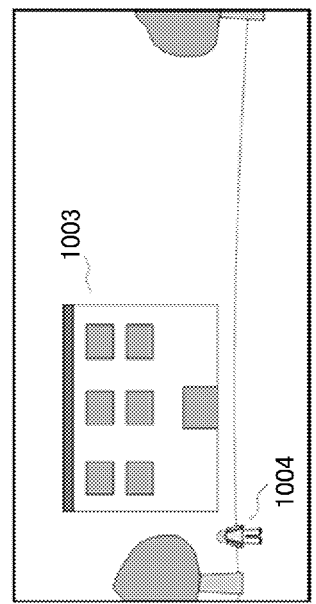

FIG. 12A shows the environment of VR video images shot successively immediately after the video image shooting in FIGS. 10A and 10B. The VR video image was taken as the digital camera 100 was installed in a shooting location 1201 and the shooting lens 103a was directed to a shooting direction 1202. FIG. 12B shows a video image to be displayed first when the video images are played back on the display 205 of the display control apparatus 200.

In Examples 1 and 2, a video image combined from a combination of the VR video image of the spring scene shown in FIGS. 10A and 10B and the VR video image of the autumn scene shown in FIGS. 11A and 11B (FIGS. 13A to 13N and FIGS. 14A to 14J) will be described as an example. In Example 3, a video image obtained by combining the VR video image of the spring scene shown in FIGS. 10A and 10B and the successive VR video images shown in FIGS. 12A and 12B shot immediately after the video image shooting shown in FIGS. 10A and 10B will be described as an example.

With reference to FIGS. 13A to 13C, S803 to S805 will be described. FIG. 13A shows the shooting environment and shooting reference direction for the N-th chapter. A shooting reference 1002 in FIG. 13A is the shooting reference direction of the chapter N and is obtained as the reference direction of the N-th chapter.

FIG. 13B shows the attitude of the user during playback of the N-th chapter, and FIG. 13C shows the region displayed when the user attitude is as shown in FIG. 13B. During the playback of the N-th chapter, the region shown in FIG. 13C is displayed on the display 205 when the user takes a user attitude 1301. FIG. 13C shows a display range centered around 120° with respect to the direction of north as 0° in the real world or a display range centered around 90° as viewed in the reference direction in the VR image.

In the S806 in FIG. 8, the CPU 201 determines whether the playback of the chapter N has been completed. When the playback of the chapter N has been completed, the process proceeds to S807. When the playback has not been completed, the process returns to S804.

In S807, the CPU 201 determines whether the chapter N+1 to be played next to the chapter N is present. When the chapter N+1 is present, the process proceeds to S808. When the chapter is not present, the processing ends.

In S808, the CPU 201 determines whether the position information about the chapter N coincides with the position information of the chapter N+1. The position information is information indicating the current position (shooting position) on the earth recorded for example by GPS. If the position information about the chapter N matches the position information chapter N+1, the process proceeds to S809, and when the information do not match, the process proceeds to S814. When either of the chapters does not hold position information, it is determined that the position information do not match.

In S809, the CPU 201 determines whether both the chapters N and N+1 hold azimuth information as metadata in the video image file. The azimuth information is information indicating the absolute directions of the reference directions of the chapters N and N+1. The CPU 201 can calculate the reference direction of each chapter using azimuth information and make the reference directions of the chapters N and N+1 the same. If both the chapters N and N+1 hold azimuth information, go to S810, and if either does not retain azimuth information, go to S813.

In S810, the CPU 201 obtains the display direction An (the direction at the center of the display range) at the end of playback of the chapter N. In S811, the CPU 201 obtains the current user attitude information α (the angle from the reference direction of the chapter N to the direction in which the user faces).

In S812, the CPU 201 changes the reference direction of the chapter N+1. The CPU 201 may set the reference direction of the chapter N+1 so that the display direction An and the attitude information α of the user at the end of playback of the chapter N match the display direction and the attitude information of the user at the start of playback of the chapter N+1. More specifically, the CPU 201 also changes the reference direction of the chapter N+1 so that the display direction An=attitude information α+reference direction of the user is established with respect to chapter N+1. More specifically, the reference angle is changed so that An=α+(reference angle) is established. In the case in FIG. 13G, since the reference angle is 140°, the reference angle is changed by 110° to be 30°. The reference angle is obtained by An (250°)=α(220°)+30°.

The processing in S810 to S812 will be described with reference to FIGS. 13A to 13N. FIG. 13D shows user attitude 1302 at the end of playback of the N-th chapter, and FIG. 13E shows the region displayed at the time of the user attitude 1302 shown in FIG. 13D. FIG. 13E shows a display range centered around 250° with respect to the direction of north as 0° in the real world or a display range centered around 220° as viewed in the reference direction in the VR image.

According to the embodiment, at the end of the N-th chapter, the user takes the user attitude 1302 and faces the direction of 220°. At this time, the region shown in FIG. 13E is displayed on the display 205.

FIG. 13F shows the shooting environment and the shooting reference direction of the N+1 chapter, and FIG. 13G shows the attitude of the user at the start of playback of the N+1-th chapter. The user attitude 1303 in FIG. 13G is the user attitude at the end of the chapter N and the user faces the direction of 220°.

At the end of the chapter N, the range centered around 250° with respect to the direction of north as 0° is displayed, while at the start of the chapter N+1, it is desired that the range centered around 250° with respect to the direction of north as 0° is again displayed. In the chapter N+1, since the reference direction is 140° with respect to the direction of north as 0°, FIG. 13H shows a display range 220° turned from 140° and centered around 0° with respect to the direction of north as 0° in the real world.

At this time, by changing the reference direction from 140° to 30°, the user can view the same display range as that at the end of the chapter N when playback of the chapter N+1 starts. More specifically, as shown in FIG. 13I, by correcting the reference direction to 1304, the same display range as that in FIG. 13E shown in FIG. 13J is displayed.

When the user attitude is changed at the start of the chapter N+1 from that at the end of the chapter N, for example, to 300° with respect to north as 0° as shown in FIG. 13K, the following is performed. In S812, the reference angle is changed to 310° so that An (250°)=α(300°)+the reference angle holds. More specifically, the reference angle is changed by 280°. In this way, as shown in FIG. 13L, the same display range as that in FIG. 13E is displayed.

Alternatively, it may be as follows. When the user attitude is changed from 220° to 300° at the start of playback of the chapter N+1, it is possible that the user may try to view the same display range (300°+30°=330°) as that in the chapter N, which is the previous chapter. Therefore, when the user attitude is changed at the time of playback and switching between the chapters, the reference angle of the chapter N+1 is changed so that the reference angle of the chapter N+1 is the same as that of the chapter N. The display range is then displayed according to the changed user attitude. When the user attitude is set to 300° from 220° as shown in FIG. 13M, the display range centered around 250+80=330° with respect to north as 0° in the real world is displayed as shown in FIG. 13N.

As a result, the display as shown in FIG. 13N is displayed on the display 205, and the user can continue to view the direction the user has viewed just before the chapter N+1.

With reference to FIGS. 12A and 12B, the case in which the user attitude changes after the end of playback of the chapter N will be described as another specific example of the processing in S810 to S812. Let us assume that the user attitude has changed to 300° from north as 0° as shown in FIG. 12A from the end of the chapter N at the start of the chapter N+1.

In S812, the reference direction at the start of playback of the chapter N+1 is set such that the display direction An is 250° with respect to north as 0°. More specifically, the reference direction at the start of playback of the chapter N+1 is set so that the user attitude information α(300°)+the reference direction=the display direction An(250°) holds. More specifically, it should be that the user attitude information α(300°)+the reference direction=250°+360n (where n is an integer), and the reference direction can be set to 310°.

When the reference direction of the chapter N+1 is changed from 140° to 310°, the display direction An of the chapter N+1 is 250°, and the display range shown in FIG. 12B is displayed on the display 205. As described above, the display direction An of the chapter N+1 is in the same direction as the display range at the end of playback of the chapter N shown in FIG. 11B. The user can continue to view the display direction of chapter N the user has viewed immediately before the chapter N+1.

When the user attitude changes to 300° with respect to north as 0° as shown in FIG. 12A at the start of playback of the chapter N+1, the reference direction of the chapter N+1 may be changed as follows.

The user may try to view the same display range as that at the end of playback of the chapter N. Therefore, when the user attitude is changed at the time of playback and switching between the chapters, the display direction An of the chapter N+1 is first changed from 140° to 30° so that the direction is the same as the display direction at the end of playback of the chapter N. Thereafter, the reference direction of the chapter N+1 may be changed according to a change in the user attitude. For example, when the user attitude information α is changed from 220° to 300°, the display direction An of the chapter N+1 becomes 330°=300° (user attitude information α)+30° (the reference direction after the change) with respect to north as 0°. In this case, the display range of the chapter N+1 is centered around the display direction 330° with respect to north as 0° as shown in FIG. 12C.

In the S813 in FIG. 8, the CPU 201 performs reference direction setting processing using a matching subject. The processing in S813 will be described in detail in Example 2. In S814, the CPU 201 adds 1 to the variable N. The process returns to S803, and the CPU 201 plays the next chapter.

Example 2

In Example 2, the reference direction of the chapter N+1 is changed using a common subject (matching subject) extracted from a video image of each chapter when the azimuth information about the chapter is not held as metadata.

The matching subject is not limited to a stationary subject such as a building and a mountain but may be a dynamic subject such as a person and an animal. When more than one common subject is detected from the chapters N and N+1, the matching subject may be a common subject which is detected first.

In Example 2, even when the azimuth information about each chapter is not held as metadata, the display control apparatus 200 can display the same display direction when the chapter switches.

Example 2 is about processing performed when it is determined in S809 in the playback processing shown in FIG. 8 that the chapters N and N+1 do not hold azimuth information. Since the chapters N and N+1 do not hold azimuth information, matching subjects are used to align absolute directions between chapters. It is determined in S808 in FIG. 8 that the shooting location (shooting position) in the chapters N and N+1 coincide. Therefore, the surrounding subjects are almost the same. Therefore, a subject common to both of the chapters can be extracted as a matching subject and the absolute directions of the chapters may be the same using the matching subject as a reference.

Figure 9:
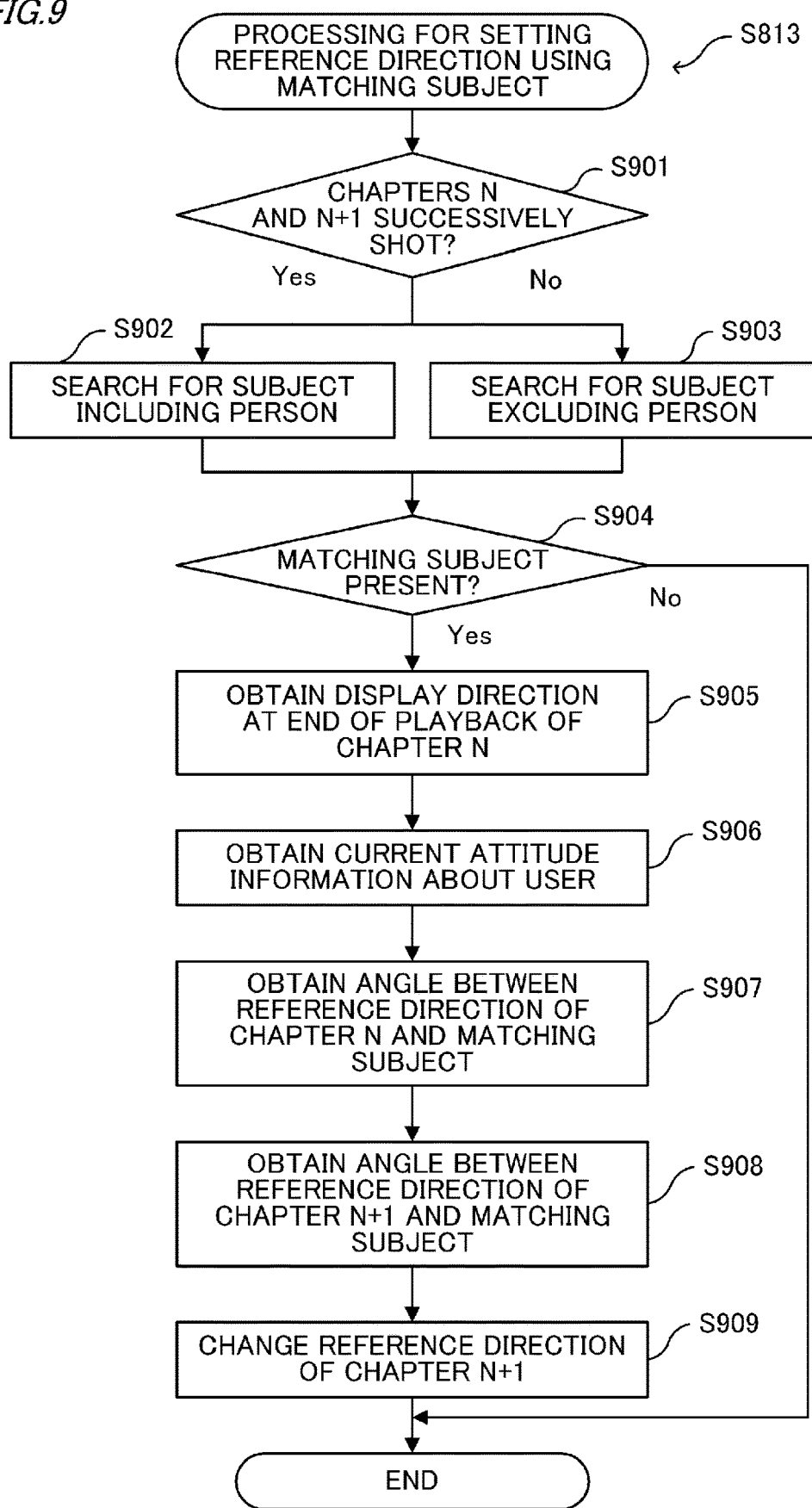
FIG. 9 is a flowchart for illustrating reference direction setting processing using a matching subject.

In Example 2, similarly to Example 1 described with reference to FIG. 8, the display control apparatus 200 performs processing for displaying a VR video image including a plurality of chapters. In Example 2, the reference direction of the chapter N+1 played after chapter N is set using a matching subject common to both chapters. FIG. 9 is a flowchart for illustrating reference direction setting processing using a matching subject. The processing illustrated in FIGS. 8 and 9 is carried out as a program recorded in the non-volatile memory 203 is developed in the memory 202 and executed by the CPU 201. The processing starts when the power supply for the display control apparatus 200 is turned on and the user plays a video image.

In the processing in FIG. 8, the same kinds of processing as those of Example 1 will not be described. In S809 in Example 2, the CPU 201 determines that the chapters N and N+1 do not hold azimuth information, and the process proceeds to S813.

In S813, the CPU 201 performs processing for setting a reference direction by the matching subject. Here, FIG. 14A shows an example of the situation when chapter N is taken, and FIG. 14F shows an example of the situation when chapter N+1 is taken. In Example 2, the azimuth information about the chapters N and N+1 during shooting is not recorded.

The shooting reference 1002 in FIG. 14A is the shooting reference direction of the chapter N. FIG. 14B shows the attitude of the user during playback of the N-th chapter, and FIG. 14C shows the region displayed when the user attitude is as shown in FIG. 14B. During playback of the N-th chapter, the region shown in FIG. 14C is displayed on the display 205 when the user takes the user attitude 1401. FIG. 14C shows a display range centered around 120° from a matching subject or a display range centered around 90° as viewed in the reference direction in the VR image.

With reference to FIG. 9, details of the reference direction setting processing performed using the matching subject in S813 in FIG. 8 will be described. In S901, the CPU 201 determines whether the chapters N and N+1 were shot successively.

When shooting of the chapter N+1 was started within a prescribed time period after the completion of the shooting of the chapter N, the CPU 201 can determine that the chapters N and N+1 were shot successively. When the shooting of the chapter N+1 was started after the prescribed time period after the completion of the shooting of the chapter N, the CPU 201 can determine that the chapters N and N+1 were not shot continuously. When the chapters N and N+1 were shot successively, the process proceeds to S902, and when the chapters were not taken successively, the process proceeds to S903.

In S902, the CPU 201 searches for a matching subject including a dynamic subject such as a person and an animal. When the shooting of the chapter N+1 was started within the prescribed time period after the completion of the shooting of the chapter N, a dynamic subject such as a person had a limited amount of movement and can be used as a reference for matching between the chapters. In this case, the prescribed time period may be one minute. The prescribed time period may be a preset time period or may be changed as desired by the user.

In S903, the CPU 201 searches for a matching subject excluding a person or an animal. The processing in S903 excluding a dynamic subject such as a person and an animal will be described in detail in connection with Example 3.

In S904, the CPU 201 determines whether a matching subject exists between the chapters N and N+1. The CPU 201 can determine that a matching subject exists when a common subject is detected from the chapters N and N+1.

When multiple common subjects are detected, the CPU 201 may select the common subject detected first as the matching subject. The CPU 201 may also select a common subject present in the reference direction of the chapter N as a matching subject. When there is a matching subject, the process proceeds to S905 and ends the processing when there is no matching subject.

In S905, the CPU 201 obtains the display direction An at the end of playback of the chapter N. In S906, the CPU 201 obtains the user attitude information α at the start of playback of the chapter N+1.

In S907, the CPU 201 determines the angle β(N) of the reference direction as viewed from the matching subject in the chapter N. More specifically, when the matching subject is a subject 1003, as shown in FIG. 14A, the reference direction is at a position 30° shifted in the VR video image, so that β(N)=30°. In this way, the angle can be set using the matching subject as a reference, even when there is no azimuth information at the time of shooting.

FIG. 14D shows the user attitude 1402 at the end of playback of the N-th chapter and FIG. 14E shows the region displayed when the user position is 1402 shown in FIG. 14D. FIG. 14E shows a display range centered around 250° from the matching subject or a display range centered around 220° from the reference direction in the VR image.

In the example, at the end of the N-th chapter, the user takes a user attitude 1402 and faces the direction of 220°. At this time, the region shown in FIG. 14E is displayed on the display 205.

In S908, the CPU 201 determines the angle β(N+1) of the reference direction as viewed from the matching subject of the chapter N+1. More specifically, when the matching subject is the subject 1003, as shown in FIG. 14F, the reference direction is at a position 140° shifted in the VR video image, so that β(N+1)=140°. FIG. 14G shows the user attitude at the start of playback of N+1-th chapter. The user attitude 1403 in FIG. 14G shows the user attitude at the end of the chapter N and faces the direction of 220°.

At the end of the chapter N, the range centered around 250° from the matching subject is displayed, but it is desired that the range centered around 250° from the matching subject is displayed at the start of the chapter N+1. In the chapter N+1, since the reference direction is 140° from the matching subject, a display range rotated 220° from 140° and centered around 0° from the matching subject as 0° is displayed as shown in FIG. 14H.

In S909, the CPU 201 changes the reference direction so that the display range at the end of playback of the chapter N is displayed. In other words, An=α+reference angle holds. More specifically, β(N+1) is changed to β(N). In this example, β(N+1) is changed to 30° from 140°. More specifically, as shown in FIG. 14I, by correcting the reference direction to 1404, the same display range as that in FIG. 14E shown in FIG. 14J is displayed.

By changing the reference angle as described above, the user can confirm the same display range as that at the end of the chapter N even when the reference angle changes as the chapter is switched to the chapter N+1. In the example, the building is the matching subject, but the matching subject may be a landmark subject such as a mountain or a copper statue.

Example 3

In Example 3, the reference direction of the chapter N+1 is changed using a common subject (matching subject) extracted from images in chapters when the azimuth information about each chapter is not held as metadata. In Example 2, the matching subject is not limited to a stationary subject and is selected from a dynamic subject such as a person and an animal. In contrast, in Example 3, a dynamic subject is excluded, a matching subject excluding a person and an animal is selected, and the reference direction of the chapter N+1 is changed.

In Example 3, as described in connection with Example 1 with reference to FIG. 8, the display control apparatus 200 executes processing for displaying a VR video image including a plurality of chapters. In Example 3, the reference direction of the chapter N+1 played after chapter N is set using a matching subject common to both chapters. FIG. 9 is a flowchart for illustrating reference direction setting processing using the matching subject. The processing illustrated in FIGS. 8 and 9 is carried out as a program recorded in the non-volatile memory 203 is developed in the memory 202 and executed by the CPU 201. The processing starts when the power supply for the display control apparatus 200 is turned on and the user plays a video image.

In the processing in FIG. 8, the same kinds of processing as those of Examples 1 and 2 will not be described. The processing in S901 and S902 in FIG. 9 will be described.

In S901, the CPU 201 determines whether the chapters N and N+1 were shot successively. When the shooting of the chapter N+1 is started within a prescribed time period after the completion of shooting of the chapter N, the CPU 201 can determine that the chapters N and N+1 were shot successively. In Example 3, since the chapters N and N+1 were not shot successively, the process proceeds to S903. In S903, the CPU 201 searches for a matching subject excluding a person or an animal.

When the chapters N and N+1 were not shot successively; it is not preferable that a dynamic subject such as a person is used as a reference for matching between chapters. Therefore, when shooting of the chapter N+1 was not started within the prescribed time period after the completion of shooting of the chapter N, the CPU 201 detects a matching subject excluding a person or an animal. Therefore, the CPU 201 can appropriately select a matching subject according to whether both chapters were shot successively.

In each of the examples, when the user attitude is significantly changed after playback of the chapter N, the CPU 201 may not match the display range at the start of playback of the chapter N+1 to the display range at the end of playback of the chapter N. In this case, the CPU 201 does not change the reference direction of the chapter N+1 according to the chapter N, and it is sufficient to play the chapter N+1 using the reference direction during the shooting.

As described above, according to the described examples, when playing a VR video image including a plurality of chapters, the user can view the VR video image while maintaining the viewing direction (display direction) between chapters.

In the description of the examples, a video image includes multiple chapters is played back. However, the present invention is not limited by these examples, and is also applicable to successive playback of multiple video images.

The various kinds of control described above as being performed by the CPU 201 may be performed by one kind of hardware, or the entire device may be controlled by multiple kinds of hardware (for example, a plurality of processors or circuits) sharing the processing.

While the present invention has been described in detail with reference to the preferred embodiments, the present invention is not limited by these specific embodiments, and various forms which do not depart from the gist and spirit of the present invention are also encompassed by the present invention. Furthermore, each of the embodiments described above is merely indicative of one embodiment of the present invention and the embodiments may be combined as appropriate.

In the description of the embodiments, the present invention is applied to a display control apparatus, but the invention may be applied to an imaging apparatus or an electronic apparatus which can accept eye-tracking input other than the above. For example, the present invention may be applied to a personal computer, a PDA, a mobile phone terminal, a portable image viewer, a printer device, a digital photo frame, a music player, a game machine, an electronic book reader, and a video image player. The present invention may also be applied to a tablet terminal, a smartphone, a projecting device, a home electrical appliance equipped with a display, and a vehicle on-board device. The present invention may also be applied to wearable devices such as a head mount display (HMD), a display device (including a projecting device), a tablet terminal, a smartphone, an AI speaker, home appliances, an on-board device, and a medical device.

According to the present invention, a desired display range can be displayed even when the display range is not set by the user before starting playback.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-044306, filed on Mar. 13, 2020, which is hereby incorporated by reference herein in its entirety.

What is claimed is:

1. An electronic apparatus capable of playing back a VR (virtual reality) video image, the apparatus comprising:
   a processor; and
   a memory storing a program which, when executed by the processor, causes the electronic apparatus to:
   obtain attitude information about the electronic apparatus;
   control playback of a VR video image such that a range of a part in each of frame images included in the VR video image is displayed on a screen, the part being based on a direction corresponding to the attitude information;
   execute pattern-matching processing between a first VR video image and a second VR video image that is different from the first VR video image and detecting a common subject; and
   perform control such that, when the second VR video image starts to be played back successively after the end of playback the first VR video image, a range of a part in a second frame image of the second VR video image to be displayed first is displayed on the screen, the part being based on a difference of a direction corresponding to the attitude information at the end of playback of the first VR video image from a direction of the common subject in a first frame image displayed when the playback of the first VR video image is ended and on a direction of the common subject in the second frame image.

2. The electronic apparatus according to claim 1, wherein the pattern-matching processing is executed when the second VR video image starts to be played back successively after the end of playback of the first VR video image.

3. The electronic apparatus according to claim 1, wherein the first and second VR video images each have a reference direction,
   the reference direction of the second VR video image is corrected on the basis of an angle formed between the reference direction of the first VR video image and the direction of the common subject in the first frame image and an angle formed between the reference direction of the second VR video image and the direction of the common subject in the second frame image, and a range of a part of the second frame image is displayed, the part being based on a direction corresponding to the attitude information at the end of playback of the first VR video image and the corrected reference direction.

4. The electronic apparatus according to claim 1, wherein in a case where the first and second VR video images do not hold azimuth information, the pattern-matching processing is performed.

5. The electronic apparatus according to claim 1, wherein in a case where a plurality of the common subjects are detected, a subject detected first is used as the common subject.

6. The electronic apparatus according to claim 1, wherein the common subject is a stationary article.

7. The electronic apparatus according to claim 1, wherein the shooting location of the first VR video image and the shooting location of the second VR video image match.

8. The electronic apparatus according to claim 1, wherein the direction is the circumferential direction of a yaw axis.

9. The electronic apparatus according to claim 1, wherein the VR video image has a wider video image range than a range displayable at a time at the screen.

10. The electronic apparatus according to claim 8, wherein the VR video image has a field-of-view range of 360°.

11. A method for controlling an electronic apparatus capable of playing back a VR (virtual reality) video image, comprising:
  obtaining attitude information about the electronic apparatus;
  controlling playback of a VR video image such that a range of a part in each of frame images included in the VR video image is displayed on a screen, the part being based on a direction corresponding to the attitude information;
  executing pattern-matching processing between a first VR video image and a second VR video image that is different from the first VR video image, the first VR video image and the second VR video image having a common subject;
  detecting the common subject; and
  performing control such that, when the second VR video image starts to be played back successively after the end of playback the first VR video image, a range of a part in a second frame image of the second VR video image to be displayed first is displayed on the screen, the part being based on a difference of a direction corresponding to the attitude information at the end of playback of the first VR video image from a direction of the common subject in a first frame image displayed when the playback of the first VR video image is ended and on a direction of the common subject in the second frame image.

12. A non-transitory computer readable medium that stores a program, wherein the program causes an electronic apparatus capable of playing back a VR (virtual reality) video image to execute:
  obtaining attitude information about the electronic apparatus,
  controlling playback of a VR video image such that a range of a part in each of frame images included in the VR video image is displayed on a screen, the part being based on a direction corresponding to the attitude information;
  executing pattern-matching processing between a first VR video image and a second VR video image that is different from the first VR video image and detecting a common subject; and
  performing control such that, when the second VR video image starts to be played back successively after the end of playback the first VR video image, a range of a part in a second frame image of the second VR video image to be displayed first is displayed on the screen, the part being based on a difference of a direction corresponding to the attitude information at the end of playback of the first VR video image from a direction of the common subject in a first frame image displayed when the playback of the first VR video image is ended and on a direction of the common subject in the second frame image.

* * * * *